United States Patent
Lee et al.

(10) Patent No.: US 8,749,644 B2
(45) Date of Patent: Jun. 10, 2014

(54) METHOD AND APPARATUS FOR VIDEO STABILIZATION BY COMPENSATING FOR VIEW DIRECTION OF CAMERA

(75) Inventors: Yun-gu Lee, Seongnam-si (KR); Yang-lim Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 158 days.

(21) Appl. No.: 13/294,782

(22) Filed: Nov. 11, 2011

(65) Prior Publication Data

US 2012/0120264 A1     May 17, 2012

Related U.S. Application Data

(60) Provisional application No. 61/412,938, filed on Nov. 12, 2010.

(30) Foreign Application Priority Data

Jan. 21, 2011  (KR) .......................... 10-2011-0006488

(51) Int. Cl.
*H04N 5/228*   (2006.01)

(52) U.S. Cl.
USPC ...................................... 348/208.4; 348/222.1

(58) Field of Classification Search
USPC .................... 348/208.99, 208.1–208.7, 222.1
See application file for complete search history.

(56) References Cited

U.S. PATENT DOCUMENTS

| | | | |
|---|---|---|---|
| 2005/0201464 A1 | 9/2005 | Lee | |
| 2008/0107307 A1* | 5/2008 | Altherr | 382/107 |
| 2010/0053347 A1* | 3/2010 | Agarwala et al. | 348/208.99 |
| 2010/0253793 A1* | 10/2010 | Auberger et al. | 348/208.4 |
| 2011/0105181 A1* | 5/2011 | Mcleod | 455/556.1 |

FOREIGN PATENT DOCUMENTS

| | | |
|---|---|---|
| JP | 2005295495 A | 10/2005 |
| KR | 1020100107594 A | 10/2010 |

OTHER PUBLICATIONS

Communication dated Jun. 1, 2012 issued by the International Searching Authority in International Application No. PCT/KR2011/008518.

* cited by examiner

*Primary Examiner* — Gevell Selby
(74) *Attorney, Agent, or Firm* — Sughrue Mion, PLLC

(57) ABSTRACT

A video stabilization method includes: measuring an inter-frame camera motion based on a difference angle of a relative camera view direction in comparison with a reference camera view direction in each frame of a frame sequence of a video; generating a camera motion path of the frame sequence by using the inter-frame camera motion and determining a camera view direction adjustment angle based on a user's view direction by using the camera motion path; and compensating for the camera view direction by using the camera view direction adjustment angle in each frame.

12 Claims, 13 Drawing Sheets

FIG. 7
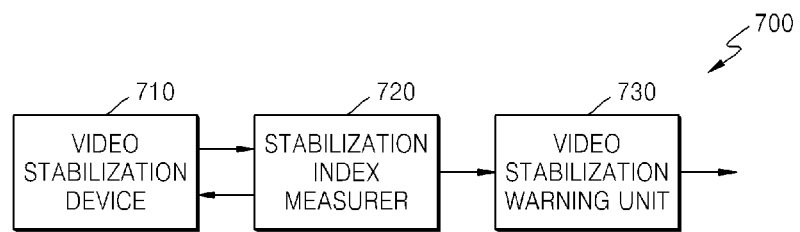
FIG. 8
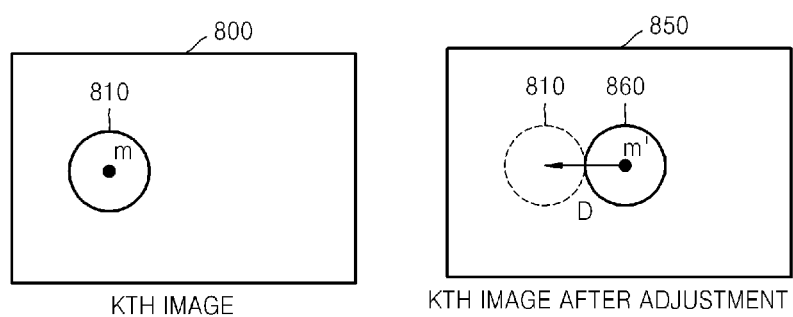
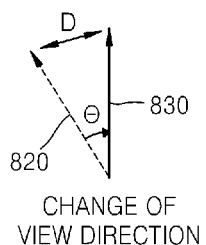
CHANGE OF
VIEW DIRECTION

ACTUAL MOTION     CHANGE OF MOTION DIRECTION     CHANGE OF MOTION POSITION

METHOD AND APPARATUS FOR VIDEO STABILIZATION BY COMPENSATING FOR VIEW DIRECTION OF CAMERA

CROSS-REFERENCE TO RELATED PATENT APPLICATIONS

This application claims the benefit of U.S. Provisional Patent Application No. 61/412,938, filed on Nov. 12, 2010, in the United States Patent and Trademark Office, and priority from Korean Patent Application No. 10-2011-0006488, filed on Jan. 21, 2011, in the Korean Intellectual Property Office, the disclosures of which are incorporated herein by reference in their entireties.

BACKGROUND OF THE INVENTION

1. Field of the Invention

Apparatuses and methods consistent with exemplary embodiments according to the present inventive concept relate to video stabilization technology for compensating for movement and shaking of a camera.

2. Description of the Related Art

Conventional video stabilization technology is classified into a video stabilization scheme based on 2-dimensional (2D) analysis and a scheme based on 3-dimensional (3D) analysis.

The video stabilization scheme based on 2D analysis includes estimating a motion, setting a camera motion path through the estimated motion, and generating an image according to the camera motion path. In the estimating of the motion, the motion is measured by analyzing a captured image with a 2D motion model. Although an image is actually obtained by projecting a 3D space into a 2D image in a camera, a 3D motion cannot be correctly modeled with the 2D motion model. Thus, although the video stabilization scheme based on 2D analysis cannot perfectly perform video stabilization, the video stabilization scheme based on 2D analysis can derive an effective result with a relatively small amount of computation.

The video stabilization scheme based on 3D analysis generally reconstructs 3D space information and camera position information from a 2D image by using motion structure analysis technology. A new camera position is defined by using the reconstructed information, and image information regarding the new camera position is synthesized. Although the video stabilization scheme based on 3D analysis requires a considerably greater amount of computation than the video stabilization scheme based on 2D analysis, the video stabilization scheme based on 3D analysis can derive correct video stabilization. However, an image upon which video stabilization has been performed based on 3D analysis may have a problem of image distortion in a partial area of the image.

SUMMARY OF THE INVENTION

Exemplary embodiments according to the present inventive concept provide a video stabilization method and apparatus for providing a screen similar to an actual motion perceived by human vision while correctly and quickly compensating for movement and shaking of a camera.

According to an aspect of one or more exemplary embodiments, there is provided a video stabilization method including: measuring an inter-frame camera motion based on a difference angle of a relative camera view direction in comparison with a reference camera view direction in each frame of a frame sequence of a video; generating a camera motion path of the frame sequence by using the inter-frame camera motion and determining a camera parameter for each frame by using the camera motion path; and compensating for a camera motion by using the camera parameter for each frame.

According to another aspect of one or more exemplary embodiments, there is provided a video stabilization method including: measuring a camera motion in each frame of a frame sequence of a video; generating a camera motion path of the frame sequence by using the camera motion in each frame and determining a camera view direction adjustment angle between a user's view direction and a camera view direction by using the camera motion path; and compensating for the camera view direction by using the camera view direction adjustment angle for each frame.

According to another aspect of one or more exemplary embodiments, there is provided a video stabilization method including: measuring a camera motion in each frame of a frame sequence of a video; determining a target area of a view direction in the frame sequence; generating a camera motion path of the frame sequence by using the camera motion in each frame and determining a camera view direction adjustment angle based on the view direction oriented to the target area by using the camera motion path; and compensating for a camera view direction by using the camera view direction adjustment angle for each frame.

According to another aspect of one or more exemplary embodiments, there is provided a video stabilization method including: measuring an inter-frame camera motion based on a difference angle of a relative camera view direction in comparison with a reference camera view direction in each frame of a frame sequence of a video; generating a camera motion path of the frame sequence by using the inter-frame camera motion and determining a camera view direction adjustment angle based on a user's view direction by using the camera motion path; and compensating for the camera view direction by using the camera view direction adjustment angle for each frame.

According to another aspect of one or more exemplary embodiments, there is provided a video stabilization method including: receiving a selection request of a target area of a view direction in a frame sequence from a user through a user interface; measuring an inter-frame camera motion based on a difference angle of a relative camera view direction in comparison with a reference camera view direction in each frame of a frame sequence of a video; generating a camera motion path of the frame sequence by using the inter-frame camera motion and determining a camera view direction adjustment angle based on a view direction oriented to the target area by using the camera motion path; and compensating for the camera view direction by using the camera view direction adjustment angle for each frame.

According to another aspect of one or more exemplary embodiments, there is provided a video stabilization method including: receiving a selection request of at least one of a margin area size and a stabilization level for video stabilization from a user through a user interface; and stabilizing a video of a camera by measuring a relative inter-frame camera motion based on a reference camera view direction in a frame sequence of the video based on the at least one of the margin area size and the stabilization level, determining a camera view direction adjustment angle based on a view direction oriented to a target area, and compensating for a camera view direction by using the camera view direction adjustment angle for each frame.

According to another aspect of one or more exemplary embodiments, there is provided a video stabilization method including: stabilizing a video of a camera by measuring a relative inter-frame camera motion based on a reference camera view direction in a frame sequence of the video, determining a camera view direction adjustment angle based on a view direction oriented to a target area, and compensating for a camera view direction by using the camera view direction adjustment angle for each frame; measuring a stabilization related index while performing the stabilization of the video of the camera; and warning in real-time if the stabilization related index exceeds a predetermined threshold.

According to another aspect of one or more exemplary embodiments, there is provided a video stabilization apparatus including: a camera motion measurer which measures an inter-frame camera motion based on a difference angle of a relative camera view direction in comparison with a reference camera view direction in each frame of a frame sequence of a video; a camera parameter determiner which generates a camera motion path of the frame sequence by using the inter-frame camera motion and determines a camera parameter for each frame by using the camera motion path; and a camera motion compensator which compensates for a camera motion by using the camera parameter for each frame.

According to another aspect of one or more exemplary embodiments, there is provided a video stabilization apparatus including: a camera motion measurer which measures a camera motion in each frame of a frame sequence of a video; a camera view direction adjustment angle determiner which generates a camera motion path of the frame sequence by using the camera motion in each frame and determines a camera view direction adjustment angle based on a user's view direction by using the camera motion path; and a camera view direction compensator which compensates for a camera view direction by using the camera view direction adjustment angle for each frame.

According to another aspect of one or more exemplary embodiments, there is provided a video stabilization apparatus including: a camera motion measurer which measures a camera motion in each frame of a frame sequence of a video; a view direction target area determiner which determines a target area of a view direction in the frame sequence; a camera view direction adjustment angle determiner which generates a camera motion path of the frame sequence by using the camera motion in each frame and determines a camera view direction adjustment angle based on the view direction oriented to the target area by using the camera motion path; and a camera view direction adjustment angle compensator which compensates for a camera view direction by using the camera view direction adjustment angle based on the view direction oriented to the target area for each frame.

According to another aspect of one or more exemplary embodiments, there is provided a video stabilization apparatus including: a camera motion measurer which measures an inter-frame camera motion by determining a difference angle of a relative camera view direction in comparison with a reference camera view direction in each frame of a frame sequence of a video; a camera view direction adjustment angle determiner which generates a camera motion path of the frame sequence by using the inter-frame camera motion and determines a camera view direction adjustment angle based on a user's view direction by using the camera motion path; and a camera view direction compensator which compensates for the camera view direction by using the camera view direction adjustment angle for each frame.

According to another aspect of one or more exemplary embodiments, there is provided a video stabilization apparatus including: a view direction target area user input unit which receives a selection request of a target area of a view direction in a frame sequence from a user through a user interface; a camera motion measurer which measures an inter-frame camera motion based on a difference angle of a relative camera view direction in comparison with a reference camera view direction in each frame of a frame sequence of a video; a camera view direction adjustment angle determiner which generates a camera motion path of the frame sequence by using the inter-frame camera motion and determines a camera view direction adjustment angle based on a view direction oriented to the target area by using the camera motion path; and a camera view direction compensator which compensates for the camera view direction by using the camera view direction adjustment angle for each frame.

According to another aspect of one or more exemplary embodiments, there is provided a video stabilization apparatus including: a margin area user input unit which receives a selection request of at least one of a margin area size and a stabilization level for video stabilization from a user through a user interface; and a video camera stabilizer which stabilizes a video of a camera by measuring a relative inter-frame camera motion based on a reference camera view direction in a frame sequence of a video based on the at least one of the margin area size and the stabilization level, determines a camera view direction adjustment angle based on a view direction oriented to a target area, and compensates for a camera view direction by using the camera view direction adjustment angle for each frame.

According to another aspect of one or more exemplary embodiments, there is provided a video stabilization apparatus including: a video camera stabilizer which stabilizes a video of a camera by measuring a relative inter-frame camera motion based on a reference camera view direction in a frame sequence of the video, determines a camera view direction adjustment angle based on a view direction oriented to a target area, and compensates for a camera view direction by using the camera view direction adjustment angle for each frame; a stabilization related index measurer which measures a stabilization related index while performing the stabilization of the video of the camera; and a video stabilization warning unit which warns in real-time if the stabilization related index exceeds a predetermined threshold.

According to another aspect of one or more exemplary embodiments, there is provided a computer-readable recording medium storing a computer-readable program for executing the video stabilization method.

BRIEF DESCRIPTION OF THE DRAWINGS

The above and other features and advantages of the present inventive concept will become more apparent by describing in detail exemplary embodiments thereof with reference to the attached drawings in which:

FIG. 7 is a block diagram of a video stabilization apparatus according to another exemplary embodiment of the present inventive concept;

FIG. 8 is a diagram for describing a camera motion measuring method according to an exemplary embodiment of the present inventive concept;

DETAILED DESCRIPTION OF THE INVENTION

Hereinafter, video stabilization apparatuses according to various exemplary embodiments of the present inventive concept are described with reference to FIGS. 1 to 7. Detailed operations of the video stabilization apparatuses according to various exemplary embodiments of the present inventive concept are described with reference to FIGS. 8 to 13. User interfaces for the video stabilization apparatuses according to various exemplary embodiments of the present inventive concept are illustrated with reference to FIGS. 14 to 16. Video stabilization methods according to various exemplary embodiments of the present inventive concept are described with reference to FIGS. 17 to 23.

Figure 1:
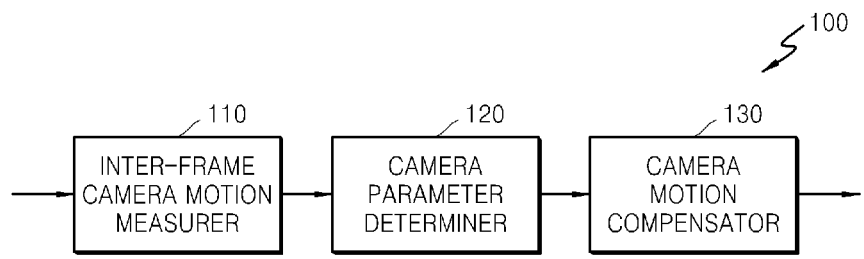
FIG. 1 is a block diagram of a video stabilization apparatus according to an exemplary embodiment of the present inventive concept.
Figure 4:
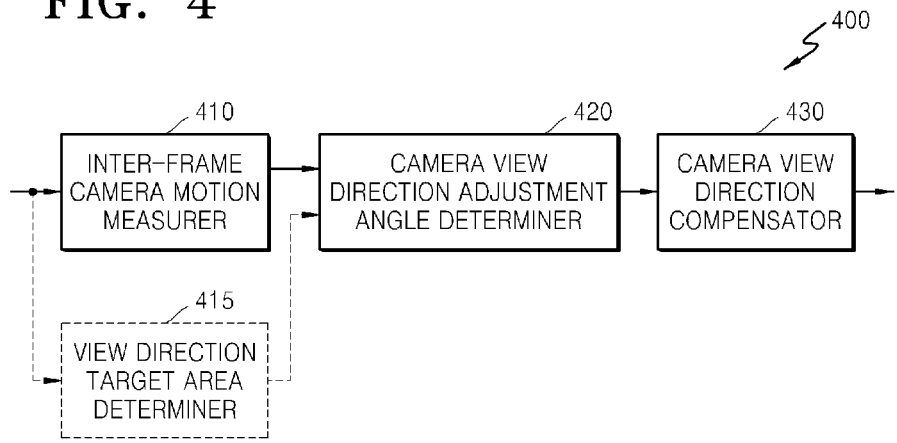
FIG. 4 is a block diagram of a video stabilization apparatus according to another exemplary embodiment of the present inventive concept.

Video stabilization apparatuses 100 and 400 according to exemplary embodiments illustrated in FIGS. 1 and 4 provide a video stabilization scheme for compensating for a camera motion by using only a relative inter-frame camera rotation angle measured as an inter-frame camera motion.

Figure 2:
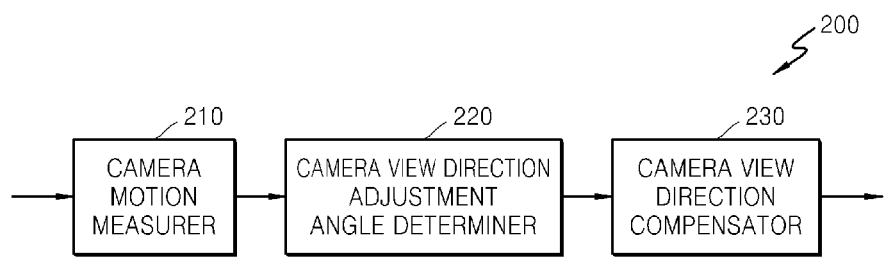
FIG. 2 is a block diagram of a video stabilization apparatus according to another exemplary embodiment of the present inventive concept.
Figure 3:
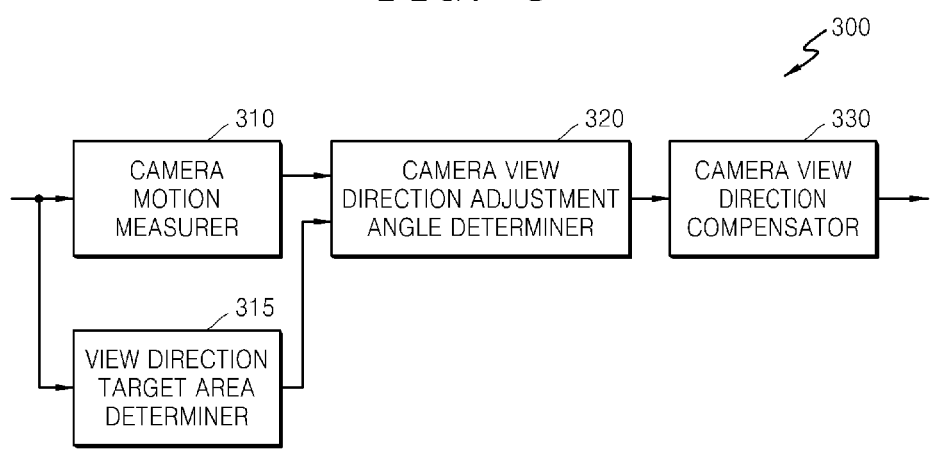
FIG. 3 is a block diagram of a video stabilization apparatus according to another exemplary embodiment of the present inventive concept.

Video stabilization apparatuses 200, 300, and 400 according to exemplary embodiments illustrated in FIGS. 2, 3, and 4, respectively, provide a video stabilization scheme for compensating for shaking of a camera by using only a difference between a camera view direction of a current frame and a user's predicted view direction on a camera motion path.

Figure 5:
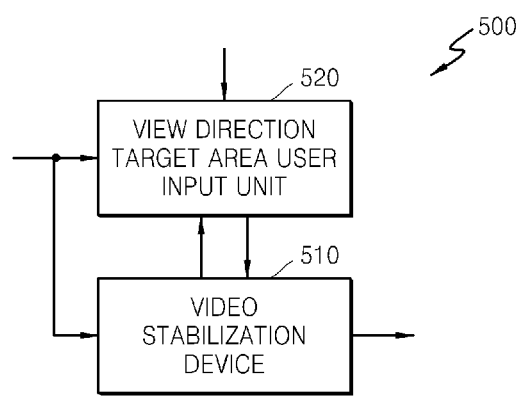
FIG. 5 is a block diagram of a video stabilization apparatus according to another exemplary embodiment of the present inventive concept.
Figure 6:
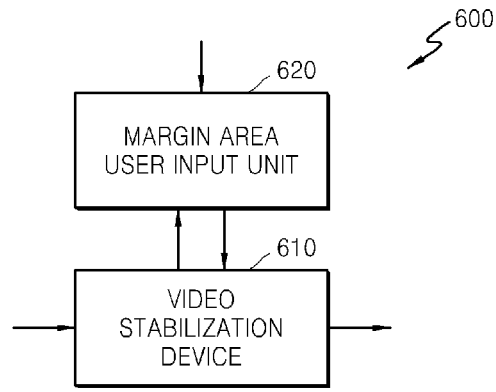
FIG. 6 is a block diagram of a video stabilization apparatus according to another exemplary embodiment of the present inventive concept.

Video stabilization apparatuses 500, 600, and 700 according to exemplary embodiments illustrated in FIGS. 5, 6, and 7, respectively, include any one of the video stabilization apparatuses 100 to 400 according to the embodiments of FIGS. 1 to 4 and provide a video stabilization scheme including a user interface.

FIG. 1 is a block diagram of the video stabilization apparatus 100 according to an exemplary embodiment of the present inventive concept.

Referring to FIG. 1, the video stabilization apparatus 100 may include an inter-frame camera motion measurer 110, a camera parameter determiner 120, and a camera motion compensator 130. The video stabilization apparatus 100 may output a stabilized video by compensating for a camera motion by using only a relative motion between camera view directions of two frames as camera motion information.

The inter-frame camera motion measurer 110 may acquire a frame sequence of a video and measure an inter-frame camera motion in each frame of the frame sequence. The camera parameter determiner 120 may generate a camera motion path of the frame sequence by using the inter-frame camera motion measured by the inter-frame camera motion measurer 110 and determine a camera parameter for each frame according to the camera motion path. The camera motion compensator 130 may compensate for the camera motion by using the camera parameter determined by the camera parameter determiner 120 for each frame.

The inter-frame camera motion measurer 110 may determine relative camera view direction information based on a reference camera view direction as inter-frame camera motion information in each frame. For example, the inter-frame camera motion measurer 110 may determine a difference angle between a camera view direction of a current frame and the reference camera view direction as the inter-frame camera motion information.

The reference camera view direction for determining a relative camera motion in a camera view direction of a current frame may be a camera view direction of a previous frame. For example, the inter-frame camera motion measurer 110 may determine a relative camera view direction difference angle between a previous frame and a current frame in every pair of temporally successive frames in a frame sequence.

Alternatively, the reference camera view direction may be commonly determined for the entire frame sequence. For example, the inter-frame camera motion measurer 110 may measure an average of camera view direction difference angles between every pair of successive frames in the frame sequence and determine the average difference angle of camera view directions as the reference camera view direction. Thus, the inter-frame camera motion measurer 110 may measure a relative camera view direction, i.e., a difference angle A-B between an average difference angle A of camera view directions and a camera view direction B of a current frame, as camera motion information in each frame based on the average difference angle of the camera view directions of the frame sequence.

The inter-frame camera motion measurer 110 may determine a camera view direction difference angle as the camera motion information with rotation angles in each of the X, Y, and Z directions. The inter-frame camera motion measurer 110 may determine X-axis and Y-axis components of a camera motion by measuring relative angle changes in the X-axis direction and the Y-axis direction between a camera view direction of a current frame and the reference camera view direction.

The inter-frame camera motion measurer 110 may determine a camera rotation angle in the Z-axis direction by using a camera motion in a straight-lined direction occurring in predetermined areas on a Z-axis plane by a camera rotation in the Z-axis direction. At least one sample area for analyzing the camera motion in the straight-lined direction occurring by the camera rotation in the Z-axis direction may be selected.

The inter-frame camera motion measurer 110 may determine a total error per camera rotation angle by determining errors occurring between sample areas of a reference frame and a current frame in the reference camera view direction for each camera rotation angle within a predetermined range among camera rotation angles in the Z-axis direction and summing the errors of the sample areas. The inter-frame camera motion measurer 110 may detect a camera rotation angle to minimize a total error of sample areas from among camera rotation angles in the Z-axis direction within a predetermined range and determine the detected camera rotation angle as a relative camera rotation angle in the Z-axis direction.

The inter-frame camera motion measurer 110 may determine a relative inter-frame camera view direction difference angle by using frames, i.e., images, of the frame sequence of the video. The inter-frame camera motion measurer 110 according to another exemplary embodiment of the present inventive concept may predict a camera motion by using a sensor. For example, the inter-frame camera motion measurer 110 may determine a relative inter-frame camera view direction difference angle by using camera motion information acquired by using a gyro sensor, a G-sensor, or an accelerometer.

The camera parameter determiner 120 may generate a camera motion path of the frame sequence by accumulating the inter-frame camera motion information measured by the inter-frame camera motion measurer 110. The camera parameter determiner 120 may also generate a global camera motion path of a camera motion path. For example, the global camera motion path may be generated through low-pass filtering of the camera motion path. A degree of stabilization may be adjusted according to a window size and strength for the low-pass filtering.

Since the inter-frame camera motion measured by the inter-frame camera motion measurer 110 is measured by using a relative camera motion such as a difference angle of camera view directions, a camera view direction and a global camera view direction on the camera motion path generated by the camera parameter determiner 120 may also be defined by a relative camera motion, e.g., a difference angle of a relative camera view direction in comparison with a predetermined reference camera view direction.

The camera parameter determiner 120 may determine a camera adjustment value based on the global camera motion path in each frame. For example, when the camera motion path is changed to the global camera motion path through video stabilization, the camera parameter determiner 120 may determine a difference between an actual camera motion path generated by accumulating inter-frame camera motions and the global camera motion path as the camera adjustment value.

The camera motion path may be defined by a camera view vector, i.e., a camera position and a camera view direction, on the camera motion path. Thus, the camera parameter determiner 120 may determine a camera position displacement between the actual camera motion path and the global camera motion path and a relative direction difference between camera view directions thereof as the camera adjustment value.

The camera parameter determiner 120 may determine a relative difference angle, i.e., a rotation angle, between the actual camera motion path and the global camera motion path by using information regarding the difference angle between a current camera view direction on the camera motion path and the reference camera view direction that is received from the inter-frame camera motion measurer 110. For example, the camera parameter determiner 120 may determine a camera view direction adjustment angle by summing the difference angle between the current camera view direction and the reference camera view direction and a rotation angle between the global camera view direction on the camera motion path and the reference camera view direction.

The camera adjustment value determined for each frame by the camera parameter determiner 120 may be outputted to the camera motion compensator 130 as a camera parameter in each frame. In particular, the inter-frame camera motion measurer 110 may extract only a variation, i.e., a rotation angle, of a camera view direction as a camera parameter and transmit the extracted rotation angle of the camera view direction to the camera motion compensator 130.

The camera motion compensator 130 may compensate for a camera motion in each frame by using the camera parameter in each frame. For example, the camera motion compensator 130 may rotate the camera view direction on the actual camera motion path by the camera view direction adjustment angle in each frame by using the camera parameter in each frame.

The video stabilization apparatus 100 may measure relative inter-frame camera motions in a frame sequence of a single point of view video, generate a camera motion path by accumulating the relative inter-frame camera motions, and perform video stabilization on the camera motion path. Here, the camera motion path may be predicted by measuring a relative camera motion between temporally successive frames in the frame sequence of the single point of view video.

In addition, the video stabilization apparatus 100 may apply a video stabilization scheme to a stereoscopic video. In detail, the inter-frame camera motion measurer 110 of the video stabilization apparatus 100 may measure an inter-viewpoint camera motion for left-viewpoint frames and right-viewpoint frames corresponding to each other in the stereoscopic video. A relative direction difference, i.e., a difference angle, of the remaining viewpoint camera view direction based on a reference viewpoint camera view direction from among a left-viewpoint and a right-viewpoint may be determined. Thus, the video stabilization apparatus 100 may perform a video stabilization operation of the stereoscopic video by the inter-frame camera motion measurer 110 measuring an inter-viewpoint camera motion in each sequential frame.

FIG. 2 is a block diagram of the video stabilization apparatus 200 according to another exemplary embodiment of the present inventive concept.

Referring to FIG. 2, the video stabilization apparatus 200 may include a camera motion measurer 210, a camera view direction adjustment angle determiner 220, and a camera view direction compensator 230. The video stabilization apparatus 200 may output a stabilized video by generating a camera motion path by using a camera motion and compensating for the camera motion by adjusting only a camera view direction excluding a camera position on the camera motion path.

The camera motion measurer 210 may receive a frame sequence of a video and measure a camera motion in each frame of the frame sequence. The camera view direction adjustment angle determiner 220 may generate a camera motion path of the frame sequence by using the camera motion in each frame that is measured by the camera motion measurer 210, and determine a camera view direction adjustment angle based on a user's view direction by using the camera motion path. The camera view direction compensator 230 may compensate for a camera view direction in each frame by using the camera view direction adjustment angle determined by the camera view direction adjustment angle determiner 220. Accordingly, the video stabilization apparatus 200 may complete a video stabilization operation.

The camera motion measurer 210 may determine a camera view vector in each frame to measure the camera motion in each frame. The camera view direction adjustment angle determiner 220 may generate the camera motion path of the frame sequence by accumulating the camera motion in each frame that is determined by the camera motion measurer 210. Thus, the camera motion path generated by the camera view direction adjustment angle determiner 220 may include information regarding the camera view vector in each frame.

The camera view direction adjustment angle determiner 220 may predict the user's view direction by using the camera motion path of the frame sequence. For example, the camera view direction adjustment angle determiner 220 may separate a global camera view direction and a local camera view direction from the generated camera motion path and determine the global camera view direction as the user's view direction.

There are various methods of separating the global camera view direction from the camera motion path of the frame sequence. For example, the global camera view direction of the frame sequence may be determined through low-pass filtering of the camera motion path, and a camera view direction on a global camera motion path may be determined as the global camera view direction. However, a method of determining the global camera motion path is not limited to the low-pass filtering.

The camera view direction adjustment angle determiner 220 may determine a camera parameter by using only the camera view direction excluding a camera position on the camera motion path. That is, the camera view direction adjustment angle determiner 220 may determine a difference angle between the user's view direction and a current camera view direction on the camera motion path as the camera view direction adjustment angle.

The camera view direction on the camera motion path may be adjusted to be oriented toward a frame center. That is, the camera view direction adjustment angle determiner 220 may detect the camera view direction adjustment angle to move a current camera view direction to the frame center.

The camera view direction compensator 230 may compensate for a camera motion by rotating a current camera view direction of a frame by the camera view direction adjustment angle determined by the camera view direction adjustment angle determiner 220.

Since the video stabilization apparatus 200 adjusts only the camera view direction excluding the camera position on the camera motion path, video stabilization may be performed with an effect that only a camera view direction on an actual camera motion path is moved to the user's view direction while a camera position on the actual camera motion path is maintained.

In addition, the video stabilization apparatus 200 may also perform a video stabilization operation of a stereoscopic video by the camera motion measurer 210 measuring an inter-viewpoint camera motion in each sequential frame for left-viewpoint frames and right-viewpoint frames corresponding to each other in the stereoscopic video.

FIG. 3 is a block diagram of the video stabilization apparatus 300 according to another exemplary embodiment of the present inventive concept.

Referring to FIG. 3, the video stabilization apparatus 300 may include a camera motion measurer 310, a view direction target area determiner 315, a camera view direction adjustment angle determiner 320, and a camera view direction compensator 330. The video stabilization apparatus 300 may compensate for a camera motion by adjusting only a camera view direction on a camera motion path, like the video stabilization apparatus 200, and may further arbitrarily select a target area of the camera view direction.

The camera motion measurer 310 may receive a frame sequence of a video and measure a camera motion in each frame of a frame sequence. The view direction target area determiner 315 may determine a target area to which a camera view direction is oriented in the frame sequence. The camera view direction adjustment angle determiner 320 may generate a camera motion path of the frame sequence by using the camera motion in each frame that is measured by the camera motion measurer 310, and determine a camera view direction adjustment angle based on a camera view direction oriented to the target area of each point on the camera motion path. The camera view direction compensator 330 may compensate for a camera view direction in each frame by using the camera view direction adjustment angle determined by the camera view direction adjustment angle determiner 320.

The camera motion measurer 310 may determine a camera view vector in each frame to measure the camera motion in each frame.

The view direction target area determiner 315 may determine the target area to which the camera view direction is oriented by analyzing a camera view direction in each frame in the frame sequence. For example, the view direction target area determiner 315 may detect a representative target area to which camera view directions are oriented or a target area of a global camera view direction by analyzing the camera view directions in the frame sequence.

Alternatively, the view direction target area determiner 315 may arbitrarily select the target area of the camera view direction or determine the target area of the camera view direction based on a request for selecting the target area of the camera view direction, which is received from the outside. The view direction target area determiner 315 may transmit information regarding the target area of the camera view direction to the camera view direction adjustment angle determiner 320.

The camera view direction adjustment angle determiner 320 may generate the camera motion path of the frame sequence by using the camera motion in each frame that is determined by the camera motion measurer 310, and determine the camera view direction adjustment angle based on the camera view direction oriented to the target area by using the camera motion path.

The camera view direction adjustment angle determiner 320 may generate the camera motion path of the frame sequence by accumulating the camera motion in each frame that is determined by the camera motion measurer 310. The camera motion path generated by the camera view direction adjustment angle determiner 320 may include information regarding the camera view vector in each frame.

The camera view direction adjustment angle determiner 320 may predict a user's view direction by using the camera motion path. In addition, when the camera view direction adjustment angle determiner 320 receives information regarding the target area of the camera view direction from the view direction target area determiner 315, the camera view direction adjustment angle determiner 320 may determine a camera view direction adjustment angle based on the target area of the camera view direction in each frame.

The camera view direction adjustment angle determiner 320 may determine the camera view direction adjustment angle based on the target area of the camera view direction by using the user's view direction or the global camera view direction.

The camera view direction adjustment angle determiner 320 may separate the global camera view direction and a local camera view direction from a current camera view direction of the camera motion path. The camera view direction adjustment angle determiner 320 may determine a first adjustment angle of the camera view direction based on the global camera view direction in each frame.

The camera view direction adjustment angle determiner 320 may analyze a displacement or a coordinate difference between a point to which the global camera view direction is oriented and the target area in a frame based on the information regarding the target area of the camera view direction that is received from the view direction target area determiner 315. The camera view direction adjustment angle determiner 320 may detect a difference angle between the global camera view direction and the camera view direction oriented to the target area by using the displacement or the coordinate difference between the point to which the global camera view direction is oriented and the target area and determine the detected difference angle as a second adjustment angle.

The camera view direction adjustment angle determiner 320 may determine the camera view direction adjustment angle by summing the first adjustment angle and the second adjustment angle of the camera view direction in each frame. The camera view direction compensator 330 may compensate for camera shaking by compensating for the camera view direction based on information regarding the camera view direction adjustment angle output from the camera view direction adjustment angle determiner 320.

In addition, the video stabilization apparatus 300 may also perform a video stabilization operation of a stereoscopic video by the camera motion measurer 310 measuring an inter-viewpoint camera motion in each sequential frame for left-viewpoint frames and right-viewpoint frames corresponding to each other in the stereoscopic video.

FIG. 4 is a block diagram of the video stabilization apparatus 400 according to another exemplary embodiment of the present inventive concept.

Referring to FIG. 4, the video stabilization apparatus 400 may include an inter-frame camera motion measurer 410, a camera view direction adjustment angle determiner 420, and a camera view direction compensator 430. The video stabilization apparatus 400 may output a stabilized video by generating a camera motion path through measurement of a camera motion with a relative motion between camera view directions of two frames and compensating for the camera motion through adjustment of only a camera view direction excluding a camera position on the camera motion path.

The inter-frame camera motion measurer 410 may receive a frame sequence of a video and measure an inter-frame camera motion based on a difference angle of a relative camera view direction in comparison with a reference camera view direction in each frame. The camera view direction adjustment angle determiner 420 may generate a camera motion path of the frame sequence by using information regarding the inter-frame camera motion that is acquired by the inter-frame camera motion measurer 410, and determine a camera view direction adjustment angle based on a target camera view direction by using the camera motion path. The camera view direction compensator 430 may compensate for a camera view direction in each frame by using the camera view direction adjustment angle determined by the camera view direction adjustment angle determiner 420.

The inter-frame camera motion measurer 410 may perform the same operation as the inter-frame camera motion measurer 110. That is, the inter-frame camera motion measurer 410 may determine a difference angle of relative camera view directions between every pair of temporally successive frames in the frame sequence as inter-frame camera motion information. The inter-frame camera motion measurer 410 may transmit the inter-frame camera motion information to the camera view direction adjustment angle determiner 420.

The inter-frame camera motion measurer 410 may determine the camera motion information by measuring relative camera view directions based on the reference camera view direction in each of the X, Y, and Z directions. The inter-frame camera motion measurer 410 may determine a relative inter-frame camera view direction difference angle by using frames, i.e., images, of the frame sequence of the video. Alternatively, the inter-frame camera motion measurer 410 may determine the relative inter-frame camera view direction difference angle by using a camera motion predicted using a sensor.

The camera view direction adjustment angle determiner 420 may generate the camera motion path of the frame sequence by accumulating inter-frame camera motions based on the inter-frame camera motion information received from the inter-frame camera motion measurer 410. The camera motion path generated by the camera view direction adjustment angle determiner 420 may be defined by only relative camera view direction difference values excluding camera position information.

Current camera view direction information may be extracted from the camera motion path. The camera view direction adjustment angle determiner 420 may determine a camera view direction adjustment angle to change a current camera view direction to a desired camera view direction.

The camera view direction adjustment angle determiner 420 may predict a user's view direction from a current camera view direction on the camera motion path. The camera view direction adjustment angle determiner 420 may determine a global camera motion path by using the camera motion path and determine a camera view direction on the global camera motion path as the user's view direction. The camera view direction adjustment angle determiner 420 may determine a first adjustment angle of the camera view direction based on the user's view direction (i.e., the global camera view direction) in each frame.

The video stabilization apparatus 400 may further include a view direction target area determiner 415. When the camera view direction adjustment angle determiner 420 receives target area information from the view direction target area determiner 415, the camera view direction adjustment angle determiner 420 may determine a camera view direction adjustment angle based on a camera view direction oriented to a target area of each point on the camera motion path of the frame sequence.

In this case, the camera view direction adjustment angle determiner 420 may determine the camera view direction adjustment angle by summing the first adjustment angle of the camera view direction based on the user's view direction (i.e., the global camera view direction) and a second adjustment angle of the camera view direction based on the camera view direction oriented to the target area, in a similar method to that employed by the camera view direction adjustment angle determiner 320 of FIG. 3.

In addition, the camera view direction adjustment angle determiner 420 may determine the camera view direction adjustment angle by using rotation angle information between a current camera view direction on the camera motion path and the reference camera view direction, which is received from the inter-frame camera motion measurer 410.

For example, the camera view direction adjustment angle determiner 420 may determine the camera view direction adjustment angle by summing a rotation angle between a current camera view direction on the camera motion path and the reference camera view direction and a rotation angle between the reference camera view direction and the camera view direction oriented to the target area. Since the current camera view direction is defined by a relative rotation angle based on the reference camera view direction, the camera view direction adjustment angle may be easily determined by using a relative rotation angle between the reference camera view direction and the camera view direction oriented to the target area.

The camera view direction compensator 430 may compensate for a camera motion by rotating a camera view direction by a camera view direction adjustment angle in each frame.

The view direction target area determiner 415 may set the global camera view direction on the camera motion path to an initial value of the camera view direction oriented to the target area.

The video stabilization apparatus 400 may also perform a video stabilization operation of a stereoscopic video by the camera motion measurer 410 measuring an inter-viewpoint camera motion in each sequential frame for left-viewpoint frames and right-viewpoint frames corresponding to each other in the stereoscopic video, in a similar method to those employed by the video stabilization apparatuses 100, 200, and 300 as described above.

FIG. 5 is a block diagram of the video stabilization apparatus 500 according to another exemplary embodiment of the present inventive concept.

Referring to FIG. 5, the video stabilization apparatus 500 may include a view direction target area user input unit 520 and a video stabilization device 510. The video stabilization device 510 may be the same as the video stabilization apparatus 300 or 400 described above.

The view direction target area user input unit 520 may receive a selection request of a target area of a camera view direction in a frame sequence from a user through a user interface. The video stabilization device 510 may receive information regarding the target area of the camera view direction that is transmitted from the view direction target area user input unit 520. The video stabilization device 510 may adjust a camera view direction based on the camera view direction oriented to the target area in the same method as that employed by the video stabilization apparatus 300 or 400. Accordingly, the video stabilization apparatus 500 may perform video stabilization for generating a result similar to vision shaking perceived by a human being by adjusting a camera view direction of a video to be oriented to a target area desired by a user.

FIG. 6 is a block diagram of the video stabilization apparatus 600 according to another exemplary embodiment of the present inventive concept.

Referring to FIG. 6, the video stabilization apparatus 600 may include a margin area user input unit 620 and a video stabilization device 610. The video stabilization device 610 may be the same as the video stabilization apparatus 100, 200, 300, or 400 described above.

The margin area user input unit 620 may receive a selection request of at least one of a margin area size and a stabilization level for video stabilization from a user through a user interface. The margin area user input unit 620 may determine the stabilization level based on the margin area size selected by the user or determine the margin area size based on the stabilization level selected by the user. Alternatively, the margin area user input unit 620 may receive a selection request of a predetermined set of a margin area size and a stabilization level from the user.

The video stabilization device 610 may receive information regarding a target area of a camera view direction that is transmitted from the margin area user input unit 620. The video stabilization device 610 may compensate for a camera motion by adjusting a camera view direction based on a predetermined camera view direction in the same method as that employed by the video stabilization apparatus 100, 200, 300, or 400. However, the video stabilization device 610 may limit a camera view direction adjustment amount based on the at least one of the margin area size and the stabilization level. For example, a measured magnitude of the camera motion, a measured magnitude of a camera view direction adjustment angle, and a variation due to the compensation for the camera view direction may be limited based on the margin area size or the stabilization level.

Accordingly, the video stabilization apparatus 600 may prevent excessive video stabilization while performing video stabilization similar to vision shaking perceived by a human being by adjusting a camera view direction of a video.

FIG. 7 is a block diagram of the video stabilization apparatus 700 according to another exemplary embodiment of the present inventive concept.

Referring to FIG. 7, the video stabilization apparatus 700 may include a video stabilization device 710, a stabilization index measurer 720, and a video stabilization warning unit 730.

The video stabilization device 710 may be the same as the video stabilization apparatus 100, 200, 300, 400, 500 or 600 described above. That is, the video stabilization device 710 may stabilize a camera motion of a video by measuring a camera motion in each frame of the video, generating a camera motion path by using the camera motions, determining a camera view direction adjustment angle based on a desired camera view direction in each frame by using the camera motion path, and compensating for a camera view direction in each frame.

The stabilization index measurer 720 may measure a stabilization related index by sensing a video camera stabilization operation of the video stabilization device 710 in real-time. The video stabilization warning unit 730 may warn in real-time if the measured stabilization related index exceeds a predetermined threshold.

The stabilization related index according to an exemplary embodiment of the present inventive concept may include at least one of a size of a margin area occurring through a video stabilization operation, a magnitude of a video camera motion sensed by a sensor, and a magnitude of an inter-frame camera motion.

The stabilization index measurer 720 may measure the stabilization related index for at least one of an inter-frame camera motion measurement operation, a camera view direction adjustment angle determination operation, and a camera view direction compensation operation by sensing the video camera stabilization operation of the video stabilization device 710 in real-time.

Accordingly, the video stabilization device 710 may sense the video camera stabilization operation in real-time and warn a user that excessive video stabilization is performed if a video stabilization index exceeds a dangerous level in each operation.

Video stabilization methods for compensating for camera shaking by using a relative inter-frame camera rotation angle as camera motion information has been described with reference to the respective video stabilization apparatuses 100 and 400 of FIGS. 1 and 4, and video stabilization methods for adjusting a camera view direction to be oriented to a predetermined target area by adjusting only the camera view direction on a camera motion path has been described with reference to the respective video stabilization apparatuses 200, 300, and 400 of FIGS. 2, 3, and 4. Camera motion compensation and video stabilization similar to vision shaking perceived by a human being may be implemented in a high speed by the video stabilization methods according to various exemplary embodiments of the present inventive concept.

When a user A captures a video with a camera while running, since the camera shakes or moves while capturing the video, a user B watching the video captured with the shaking camera may feel severely dizzy. However, even though the user A also shakes or moves while running, the user A does not feel so dizzy due to images visually perceived.

This is because a view of the user A is oriented to a subject on which the user A keeps focusing even though a position of eyes of the user A rapidly varies according to a motion of the user A. That is, since a view direction is continuously fixed to the focused subject so that the focused subject is continuously located on the center of images perceived by the eyes of the user A, even though the position of the eyes of the user A continuously moves, the user A does not feel dizzy regardless of the body shaking of the user A.

As such, a motion of the eyes of a human being, which continuously changes a view direction of a user's eyes when a position of the eyes continuously moves, will be applied to a camera. Accordingly, the video stabilization apparatuses 100, 200, 300, 400, 500, 600, and 700 according to various exemplary embodiments of the present inventive concept may realize video stabilization similar to human sight by adjusting a camera view direction to be oriented to a predetermined focused subject according to a camera motion.

In order to do this, exemplary embodiments according to the present inventive concept provide a video stabilization scheme of compensating for a camera motion by compensating for a camera view direction by a difference between a camera view direction of a current frame and a user's predicted view direction by using only a user's view direction on a camera motion path. In addition, the exemplary embodiments provide a method of predicting only a camera view direction on a camera motion path by measuring only a relative camera view direction, i.e., a rotation angle of the camera view direction, in a camera motion through adjustment of only the camera view direction.

A method of predicting a relative camera motion between sequential frames will be described below. When view directions of a Kth image and a (K+1)th image are different from each other, correct view directions of the Kth image and the (K+1)th image do not have to be known to match the view directions of the Kth image and the (K+1)th image. Instead, if only a relative direction difference, i.e., an inter-frame view direction difference, between view vectors of the Kth image, which corresponds to a reference view direction, and the (K+1)th image is known, the view direction of the (K+1)th image may be rotated by the inter-frame view direction difference to match the view direction of the Kth image. Thus, any one of the video stabilization apparatuses 100, 200, 300, 400, 500, 600, or 700 according to exemplary embodiments of the present inventive concept may be used to predict only a relative view vector difference between two frames.

In addition, a camera view direction may be adjusted by predicting a user's view direction using a relative camera motion and measuring a difference between a camera view direction of a current frame and the user's predicted view direction. Matching view directions of N frames to a single view direction may be performed by changing the view directions of the N frames based on a reference view direction. Even though the reference view direction is not correctly defined in a three dimensional space, a camera motion during a frame sequence of the N frames may be predicted by using only relative direction differences between the N frames and the reference view direction.

For example, for the N frames, relative view directions, i.e., (N−1) view direction differences, between sequential frames may be obtained, and an average of the (N−1) view direction differences may be determined. The average of the (N−1) view direction differences may be defined as a final reference view direction of the N frames. The final reference view direction may also be defined by a relative rotation angle based on an initial view direction like view vectors of the N frames. Thus, the final reference view direction may be a user's view direction or changed to another predetermined target view direction.

In addition, camera shaking may be compensated for to be similar to human sight by adjusting only a camera view direction by a difference angle between the final reference view direction and a current camera view direction without changing a camera position.

Camera motion measuring methods according to various exemplary embodiments of the present inventive concept by which a relative inter-frame camera rotation angle is measured will be described with reference to FIGS. 8 and 9.

FIG. 8 is a diagram for describing a camera motion measuring method according to an exemplary embodiment of the present inventive concept.

To correctly obtain a relationship between two images captured in different general positions, information regarding a distance between two center points of a camera and directions of camera view vectors is necessary. However, a method of measuring a camera motion by determining a displacement or coordinate difference after acquiring correct positions and coordinates of a subject of the two images by using the information regarding the distance between the two center points of the camera and the directions of the camera view vectors requires a considerable amount of computation.

However, by employing a camera motion measuring method according to an exemplary embodiment of the present inventive concept, a relative camera motion may be measured by measuring a relative direction between two camera view directions, i.e., a rotation angle of the other camera view direction based on a reference camera view direction from among the two camera view directions. In addition, a difference between the two camera view directions of the camera may be determined in each of the X-axis, Y-axis, and Z-axis directions.

For example, a subject located in a current position 810 may be picked up at an image center 860 by changing a camera view direction 820 oriented to the current position 810 in an original image 800, which is a Kth image prior to an adjustment, to a reference camera view direction 830 oriented to the image center 860 in image 850, which is the Kth image after the adjustment.

Since a camera motion between successive actual images is not great comparing to a distance between a camera and a captured subject, a moving distance according to the camera motion may be approximately equal to zero. In addition, a trigonometric function may be used to measure a relative angle between predetermined points in images through a position relationship between an image center and the predetermined points. However, since a rotation component in a camera motion between successive images is actually not great, the trigonometric function may be approximately equal to a general polynomial expression. Assuming characteristics according to such a camera motion, a rotation angle of the camera may be simply described by a general polynomial expression by using coordinates of predetermined points in images, and relative angle variations in the X-axis and Y-axis directions may be derived as result values.

Thus, a rotation angle θ between the current camera view direction 820 and the reference camera view direction 830 may be predicted using a central coordinate m of the current position 810 and a central coordinate m' of the image center 860. In addition, if a displacement between m and m' has both an X-axis directional component and a Y-axis directional component, a rotation angle in the X-axis direction and a rotation angle in the Y-axis direction may be predicted according to a displacement in the X-axis direction and a displacement in the Y-axis direction in a frame, respectively.

Figure 9:
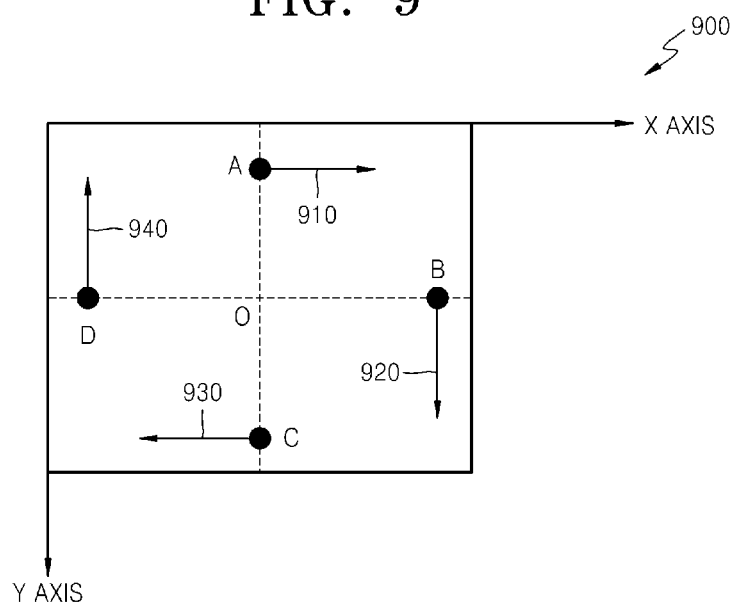
FIG. 9 is a diagram for describing a method of measuring a camera rotation angle in a Z-axis direction, according to an exemplary embodiment of the present inventive concept.

FIG. 9 is a diagram for describing a method of measuring a camera rotation angle in the Z-axis direction, according to an exemplary embodiment of the present inventive concept.

A rotation angle with respect to the Z-axis may be measured by using straight-lined motions of a plurality of sample points in an image. For example, straight-lined motions may occur on four sample points A, B, C, and D by a rotation of an image 900 in the Z-axis direction.

Due to the same rotation, the sample points A and C have straight-lined motions 910 and 930, respectively, in directions opposite to each other, and the sample points B and D have straight-lined motions 920 and 940, respectively, in directions opposite to each other. For example, when a clockwise rotation occurs with respect to the Z-axis, the sample points A, B, C, and D may have straight-lined motions to the right, downwards, to the left, and upwards, respectively.

If a width and a height of the image 900 are different from each other, the magnitudes of straight-lined motions of the sample points A and C are different from the magnitudes of straight-lined motions of the sample points B and D. For example, if the width and the height of the image 900 are W and H, respectively, and if the image 900 rotates by a rotation angle θ, the sample points B and D have a quantity of motion of approximately W/2×θ, and the sample points B and D have a quantity of motion of approximately H/2×θ. Thus, a quantity of straight-lined motion due to a rotary motion at each of the sample points A, B, C, and D may be determined based on the width and the height of the image 900.

Thus, straight-lined motions, each having a predetermined magnitude and direction, may occur at the sample points A, B, C, and D due to the same rotation, and magnitudes and directions of motion vectors in straight-lined directions, which occur at the sample points A, B, C, and D in correspondence with a rotation angle, may be determined based on a distance and direction from an original point to each of the sample points A, B, C, and D on a Z-axis plane.

After determining a cost value, such as a Sum of Absolute Difference (SAD), at each matching point in a current frame and a reference frame for each of the sample points A, B, C, and D, a motion vector having a magnitude and direction to minimize a final cost value based on cost values of all of the sample points A, B, C, and D may be determined as a motion vector between the current frame and the reference frame. That is, a quantity of motion of the motion vector to minimize the final cost value obtained by determining and summing the cost values of the sample points A, B, C, and D may be a final quantity of straight-lined motion. A measure of a rotation angle with respect to the Z-axis may be determined by converting the quantity of straight-lined motion to a rotary motion.

The number of sample points, e.g., the sample points A, B, C, and D, for measuring a quantity of motion may be increased or decreased. To measure a correct motion at each sample point, a method of measuring a motion vector in a sample area by selecting the sample area around each sample point may be used.

The inter-frame camera motion measurer 110 or 410 may determine magnitudes and directions of motion vectors in straight-lined directions, which occur in sample areas on a Z-axis plane in correspondence with each of the rotation angles in a predetermined range, to measure a Z-axis direction camera motion between frames. A total cost value of the sample areas may be determined by measuring and summing a cost value based on a difference ($c=a-b$) between an image a moved by a motion vector in a corresponding straight-lined direction and a corresponding sample area b of a frame in a reference camera reference view direction for every sample area.

The inter-frame camera motion measurer 110 or 410 may detect a rotation angle for generating an initial total cost value by comparing total costs of the sample areas, which are determined for the rotation angles, and determine the detected rotation angle as a camera rotation angle in the Z-axis direction.

Thus, the inter-frame camera motion measurer 110 or 410 may predict only a camera rotation angle without predicting an actual camera position and displacement in a camera motion between frames and transmit information regarding the predicted camera rotation angle between the frames to the camera parameter determiner 120 or the camera view direction adjustment angle determiner 220, 320, or 420. Accordingly, a computation amount for measuring a correct displacement of a camera motion may be reduced from a computation amount for measuring the camera motion, and an information amount to be transmitted to the camera parameter determiner 120 or the camera view direction adjustment angle determiner 220, 320, or 420 may also be reduced.

Figure 10:
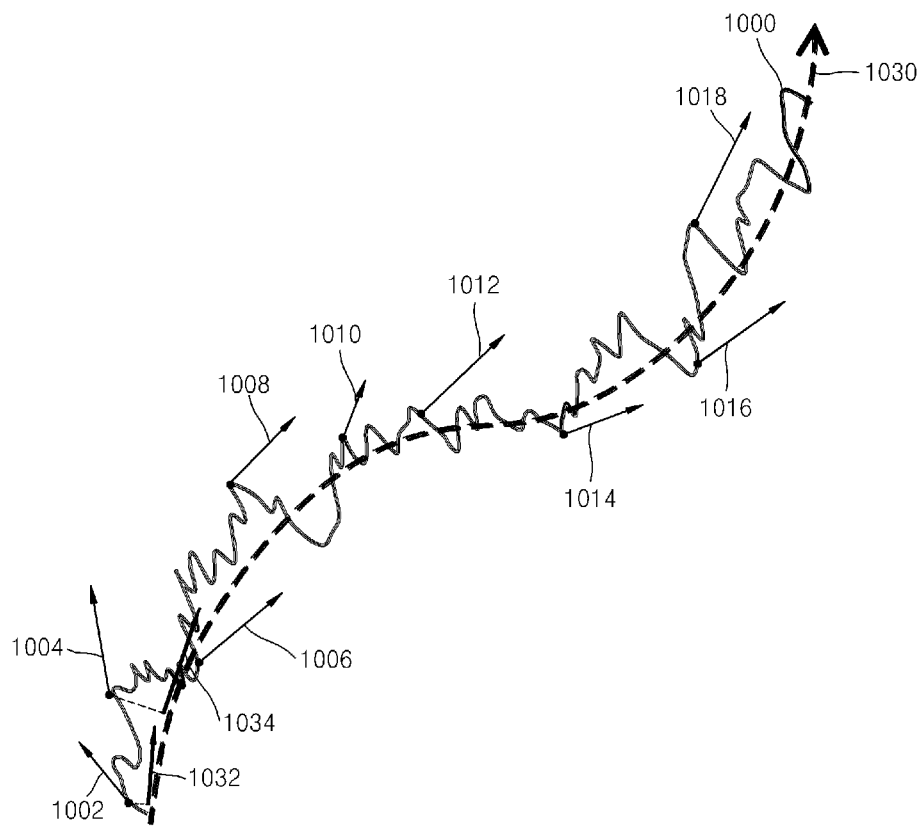
FIG. 10 is a diagram showing a camera motion path.
Figure 11:
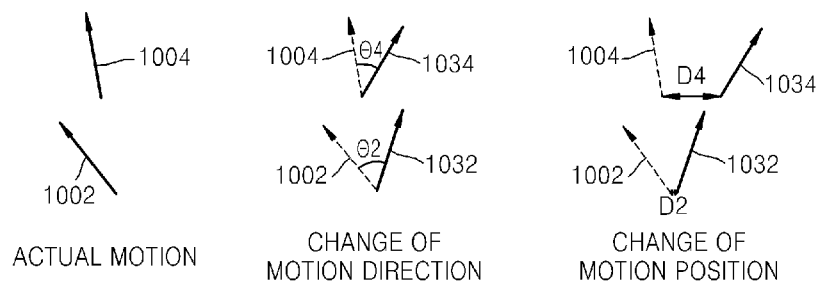
FIG. 11 is a diagram for describing a conventional video stabilization method.

FIG. 10 is a diagram showing a camera motion path, and FIG. 11 is a diagram for describing a conventional video stabilization method.

A camera motion path 1000 may be obtained by using a video acquired by a user capturing the video while moving with a camera. Information regarding the camera moving along the camera motion path 1000 may be defined by a camera position and a camera view direction in each frame.

A global camera motion path 1030 derived from the camera motion path 1000 may be determined by analyzing a frame sequence of the camera motion path 1000. In addition, each of actual camera view directions 1002, 1004, 1006, 1008, 1010, 1012, 1014, 1016, and 1018 generated in frames on the camera motion path 1000 may be divided into a global camera view direction based on the global camera motion path 1030 and a local camera view direction generated in a corresponding frame.

In detail with two frames on the camera motion path 1000, the actual camera view directions 1002 and 1004 may be divided into global camera view directions 1032 and 1034 based on the global camera motion path 1030 and local camera view directions, respectively.

According to a conventional video stabilization method, a method of predicting actual camera positions and view directions on the camera motion path 1000 to match the global camera motion path 1030 may be used.

That is, referring also to FIG. 11, after measuring the actual camera view directions 1002 and 1004 and the global camera view directions 1032 and 1034 based on original points of respective coordinate systems, respective angular differences θ2 and θ4 between the actual camera view directions 1002 and 1004 and the global camera view directions 1032 and 1034 are determined. The actual camera view directions 1002 and 1004 may match the global camera view directions 1032 and 1034 by rotating by θ2 and θ4, respectively.

In addition, actual camera positions of the actual camera view directions 1002 and 1004 on the camera motion path 1000 and their corresponding positions on the global camera motion path 1030 are predicted. Respective translational differences D2 and D4 between the actual camera positions of the actual camera view directions 1002 and 1004 and their corresponding positions on the global camera motion path 1030 are determined, respectively. The actual camera positions of the actual camera view directions 1002 may match their corresponding positions on the global camera motion path 1030 by moving by D2 and D4, respectively.

Accordingly, based on the conventional video stabilization method described above, an actual camera motion path must be adjusted to match a global camera motion path by correctly measuring all camera positions and view directions on a camera motion path and camera positions and view directions on the global camera motion path.

The video stabilization apparatuses 200, 300, and 400 may compensate for camera shaking by predicting a user's view direction through generation of a camera motion path and the use of only a difference between a camera motion path of a current frame and the user's predicted view direction. Camera shaking compensation methods according to various exemplary embodiments of the present inventive concept, by which a camera view direction is adjusted to be oriented to a predetermined view direction, will be described in detail with reference to FIGS. 12 and 13.

Figure 12:
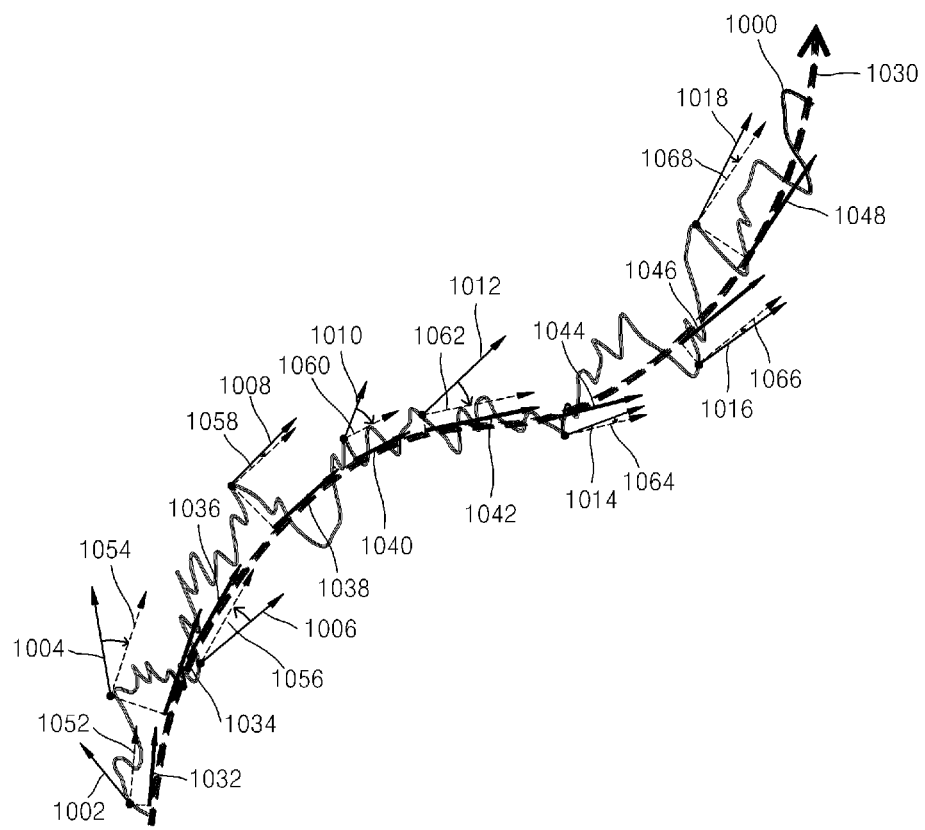
FIG. 12 is a diagram showing a camera motion path obtained by adjusting a camera motion based on a global camera view direction of the camera motion path, according to an exemplary embodiment of the present inventive concept.
Figure 13:
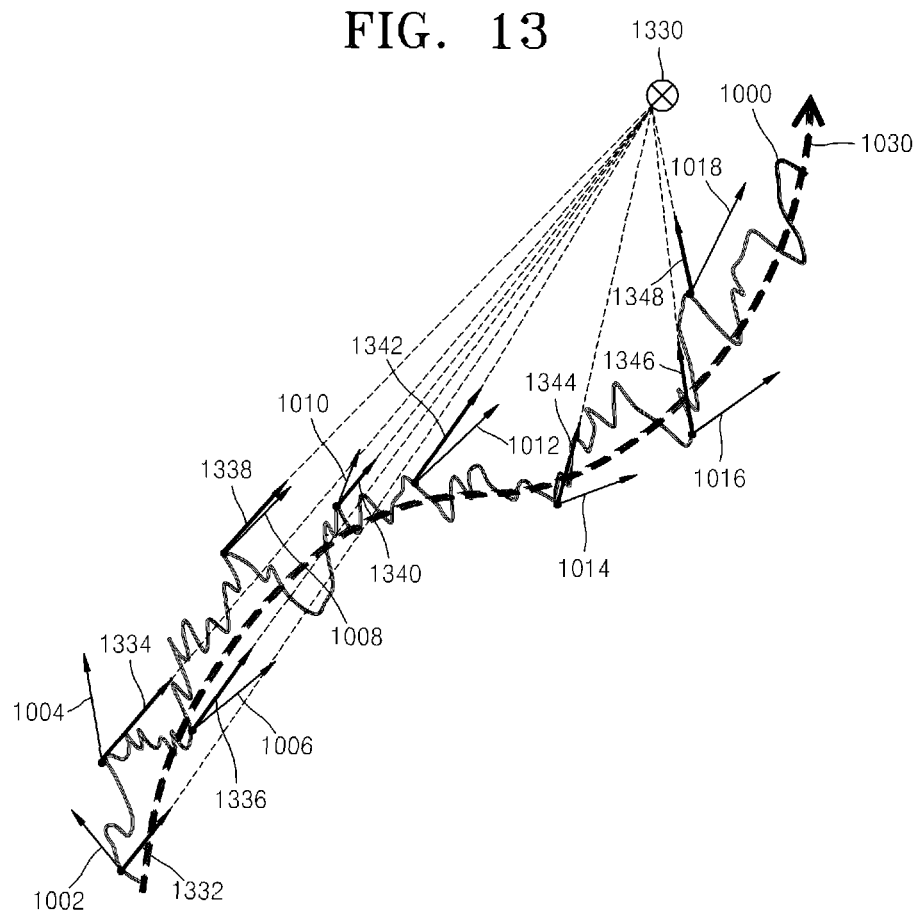
FIG. 13 is a diagram showing a camera motion path obtained by adjusting a camera motion based on a camera view direction oriented to a target area, according to an exemplary embodiment of the present inventive concept.

FIG. 12 is a diagram showing a camera motion path obtained by adjusting a camera motion based on a global camera view direction of the camera motion path, according to an exemplary embodiment of the present inventive concept. FIG. 13 is a diagram showing a camera motion path obtained by adjusting a camera motion based on a camera view direction oriented to a target area, according to an exemplary embodiment of the present inventive concept.

The camera view direction adjustment angle determiner 220, 320, or 420 of the respective video stabilization apparatuses 200, 300, or 400 may generate the camera motion path 1000 by using camera rotation angle information acquired from the camera motion measurer 210 or 310 or the inter-frame camera motion measurer 410. Current camera view directions 1002, 1004, 1006, 1008, 1010, 1012, 1014, 1016, and 1018 of frames along the camera motion path 1000 may be defined.

Since the camera view direction adjustment angle determiner 220, 320, or 420 aims at not moving an actual position of a camera but adjusting a camera view direction to be fixed onto a predetermined focal point, the camera view direction adjustment angle determiner 220, 320, or 420 requires only a relative rotation angle of the camera view direction based on a predetermined direction without predicting a correct camera position on a camera motion path.

That is, the camera view direction adjustment angle determiner 220, 320, or 420 may determine the global camera motion path 1030 occurring along the camera motion path 1000 by analyzing a frame sequence on the camera motion path 1000, and the current camera view directions 1002, 1004, 1006, 1008, 1010, 1012, 1014, 1016, and 1018 generated in corresponding frames on the camera motion path 1000 may be respectively divided into global camera view directions 1032, 1034, 1036, 1038, 1040, 1042, 1044, 1046, and 1048 and local camera view directions generated in the corresponding frames.

The camera view direction adjustment angle determiner 220, 320, or 420 may determine camera view direction adjustment angles based on the current camera view directions 1002, 1004, 1006, 1008, 1010, 1012, 1014, 1016, and 1018 and the global camera view directions 1032, 1034, 1036, 1038, 1040, 1042, 1044, 1046, and 1048 on the global camera motion path 1030. The camera view direction adjustment angle determiner 220, 320, or 420 may transmit information regarding a camera view direction adjustment angle determined for each of the frames to the camera view direction compensator 230, 330, or 430.

In particular, since a camera motion path generated according to the embodiment described with reference to FIG. 4 is generated based on only inter-frame camera rotation angle information, correct inter-frame camera positions and correct inter-frame camera capturing angles on the camera motion path are not determined, and rotation angles of camera view directions along the camera motion path may be continuously determined. Thus, each of the current camera view directions 1002, 1004, 1006, 1008, 1010, 1012, 1014, 1016, and 1018 determined by the camera view direction adjustment angle determiner 420 may correspond to a rotation angle based on a predetermined reference camera view direction. Likewise, each of the global camera view directions 1032, 1034, 1036, 1038, 1040, 1042, 1044, 1046, and 1048, the local camera view directions, and the camera view direction adjustment angles oriented to a predetermined view direction, which are determined by the camera view direction adjustment angle determiner 420, may also be defined by a relative direction difference, i.e., a rotation angle, based on the reference camera view direction.

The camera view direction compensator 230, 330, or 430 may compensate for a camera motion by adjusting a current camera view direction by a camera view direction adjustment angle based on the camera view direction adjustment angle information received from the camera view direction adjustment angle determiner 220, 320, or 420.

For example, the camera view direction compensator 230, 330, or 430 may rotate the respective current camera view directions 1002, 1004, 1006, 1008, 1010, 1012, 1014, 1016, and 1018 on the camera motion path 1000 by their corresponding camera view direction adjustment angles in their corresponding frames.

As illustrated in FIG. 12, the camera view direction adjustment angle determiner 220, 320, or 420 may determine the camera view direction adjustment angle information based on the global camera view directions 1032, 1034, 1036, 1038, 1040, 1042, 1044, 1046, and 1048. The camera view direction adjustment angle determiner 220, 320, or 420 may measure difference angles between the respective current camera view directions 1002, 1004, 1006, 1008, 1010, 1012, 1014, 1016, and 1018 on the camera motion path 1000 and their corresponding global camera view directions 1032, 1034, 1036, 1038, 1040, 1042, 1044, 1046, and 1048 and determine the measured difference angles as camera view direction adjustment angles. That is, the camera view direction compensator 230, 330, or 430 may rotate the respective current camera view directions 1002, 1004, 1006, 1008, 1010, 1012, 1014, 1016, and 1018 by their corresponding camera view direction adjustment angles in their corresponding frames to match their corresponding global camera view directions 1032, 1034, 1036, 1038, 1040, 1042, 1044, 1046, and 1048.

Thus, only the current camera view directions 1002, 1004, 1006, 1008, 1010, 1012, 1014, 1016, and 1018 may be adjusted to their corresponding camera view directions 1052, 1054, 1056, 1058, 1060, 1062, 1064, 1066, and 1068 by the camera view direction compensator 230, 330, or 430 without a position change in their corresponding frames on the camera motion path 1000. That is, after the adjustment, the camera view directions 1052, 1054, 1056, 1058, 1060, 1062, 1064, 1066, and 1068 may match the corresponding global camera view directions 1032, 1034, 1036, 1038, 1040, 1042, 1044, 1046, and 1048 in their current frames, respectively.

As illustrated in FIG. 13, the camera view direction adjustment angle information may be determined so that camera view directions are oriented to a predetermined target point. The camera view direction adjustment angle determiner 220, 320, or 420 may measure a difference angle between a current camera view direction on the camera motion path 1000 and a target view direction oriented to a target point 1330 and determine the measured difference angle as a camera view direction adjustment angle. That is, the camera view direction compensator 230, 330, or 430 may rotate the current camera view directions 1002, 1004, 1006, 1008, 1010, 1012, 1014, 1016, and 1018 by their corresponding camera view direction adjustment angles in their corresponding frames to match their corresponding camera view directions 1332, 1334, 1336, 1338, 1340, 1342, 1344, 1346, and 1348 oriented to the target point 1330.

Thus, the camera view directions 1332, 1334, 1336, 1338, 1340, 1342, 1344, 1346, and 1348 for which camera motions are compensated by the camera view direction compensator 230, 330, or 430 may be adjusted to focus on the target point 1330 in their corresponding current positions.

Accordingly, the video stabilization apparatuses 200, 300, and 400 may not only adjust a global camera view direction on a global camera motion path or a camera view direction oriented to a frame center, but also adjust a camera view direction to be oriented to a predetermined target point or fixed to a target view direction. The predetermined target point to which the camera view direction is oriented or the target view direction may be set according to a desire of a user capturing a video.

In addition, since a video stabilization operation may be performed while reproducing a video by using a video stabilization method according to an exemplary embodiment of the present inventive concept in not only a video capturing device but also a video reproducing device, a predetermined target point to which a camera view direction is oriented or a target view direction may be set according to a desire of a user watching the video.

Since a camera view direction is fixed to be continuously oriented to a predetermined target point without changing an actual camera motion path and a camera position, the video stabilization apparatuses 200, 300, and 400 may acquire a video similar to a motion visually perceived by a human being. In addition, since a camera motion may be compensated for by adjusting a camera view direction by using only the camera view direction without measuring a correct displacement on a camera motion path or using only a relative variation or rotation angle of the camera view direction, the camera motion path may be correctly recovered, thereby reducing a computation amount as compared with conventional methods of adjusting a camera displacement and a camera view direction by correctly recovering a camera motion path.

User interfaces for effectively using video stabilization methods of the video stabilization apparatuses 100, 200, 300, and 400 will be described below with reference to FIGS. 14 to 16.

Figure 14:
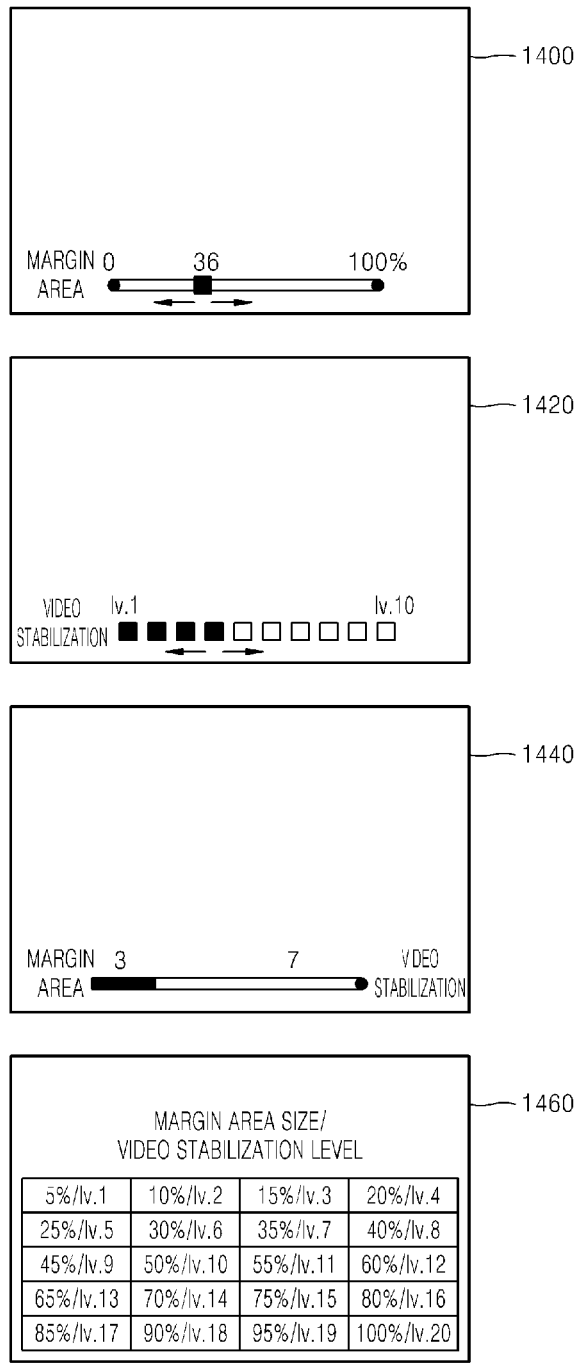
FIG. 14 is a diagram showing user interfaces for adjusting a size of a margin area and a degree of video stabilization according to a video stabilization operation, according to an exemplary embodiment of the present inventive concept.

FIG. 14 is a diagram showing user interfaces for adjusting a size of a margin area and a degree of video stabilization according to a video stabilization operation, according to an exemplary embodiment of the present inventive concept.

The camera view direction compensator 130, 230, 330, or 430 of the respective video stabilization apparatus 100, 200, 300, or 400 may rotate a current camera view direction to a target view direction. In particular, a camera view direction in the Z-axis direction may be changed by rotating an image in parallel to the Z-axis plane by a rotation angle in the Z-axis direction among rotation angle components in the X-axis, Y-axis, and Z-axis directions of a camera view direction adjustment angle.

When video stabilization is performed according to such a rotation of a camera view direction, since the outer portion of an image is lost or not completely recovered due to a rotation of a frame, an angle of view actually seen by a user is narrower than the angle of view corresponding to an original image. As a result, a user of a video reproducing device may watch only an image within the angle of view, which remains in the inner portion, or only a valid image recovered in such a way may be stored in a video capturing device or a storage device. The higher a degree of video stabilization is, the greater amount of an area (i.e., margin area) is lost according to the extent of the increase in video stabilization. If the video stabilization is excessively performed without considering a margin area, a size of a valid image may be considerably reduced. That is, a trade-off may exist between a video stabilization effect and a margin area size.

Thus, any of the video stabilization apparatuses 100, 200, 300, 400, 500, or 700 may be equipped in the same manner as the video stabilization device 610 of the video stabilization apparatus 600. The margin area user input unit 620 of the video stabilization apparatus 600 may provide user interfaces 1400, 1420, 1440, and 1460 for a user to tune a margin area and a degree of video stabilization.

The user interface 1400 displays a slice bar for the user to freely select a size of a margin area or a ratio of the size of the margin area to the entire image size. The margin area user input unit 620 according to the exemplary embodiments of FIGS. 1 to 4 may determine a degree of video stabilization based on the size of the margin area or the ratio of the size of the margin area to the entire image size, which is input through the user interface 1400.

The user interface 1420 displays a slice bar for the user to freely select a video stabilization level indicating a degree of video stabilization. The margin area user input unit 620 according to the exemplary embodiments of FIGS. 1 to 4 may determine a size of a margin area or a ratio of the size of the margin area to the entire image size based on the video stabilization level inputted through the user interface 1420.

The user interface 1440 displays a slice bar for the user to freely select a trade-off of a video stabilization level in comparison with a margin area. The user interface 1460 displays a lookup table of video stabilization levels in comparison with margin areas for the user to select a combination in which a trade-off of a video stabilization level in comparison with a margin area is optimized. The user may select a margin area size, a video stabilization level, or a trade-off of a video stabilization level in comparison with a margin area by using a user controller linked to the user interfaces 1400, 1420, 1440, and 1460.

The margin area user input unit 620 according to the exemplary embodiments of FIGS. 1 to 4 may determine a margin area size or a degree of video stabilization based on a user's input through the user interface 1400, and the camera parameter determiner 120 or the camera view direction adjustment angle determiner 220, 320, or 420 may determine a camera view direction adjustment angle based on the determined margin area size or the determined degree of video stabilization.

Figure 15:
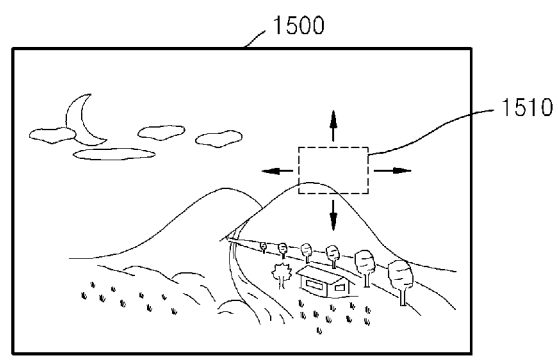
FIG. 15 is a diagram showing a user interface for a user to set a target area of a camera view direction for a video stabilization operation, according to an exemplary embodiment of the present inventive concept.

FIG. 15 is a diagram showing a user interface for a user to set a target area of a camera view direction for a video stabilization operation, according to an exemplary embodiment of the present inventive concept.

Any one of the video stabilization apparatuses 300, 400, 600, or 700 may be equipped in the same manner as the video stabilization device 510 of the video stabilization apparatus 500. The view direction target area user input unit 520 of the video stabilization apparatus 500 may provide a user interface 1500 for a user to set a target area of a camera view direction or a target view direction. The user interface 1500 displays a selection window 1510 capable of freely moving left and right and up and down on a current video capturing scene or a captured video image. The user may move the selection window 1510 to a desired target point to which a camera view direction is fixed by using a motion controller of the selection window 1510, which is linked to the user interface 1500.

The view direction target area determiner 315 or 415 according to the respective exemplary embodiments of FIGS. 3 and 4 may determine a target area and a target view direction based on a user's input through the user interface 1500, and the camera view direction adjustment angle determiner 320 or 420 may determine a camera view direction adjustment angle.

Figure 16:
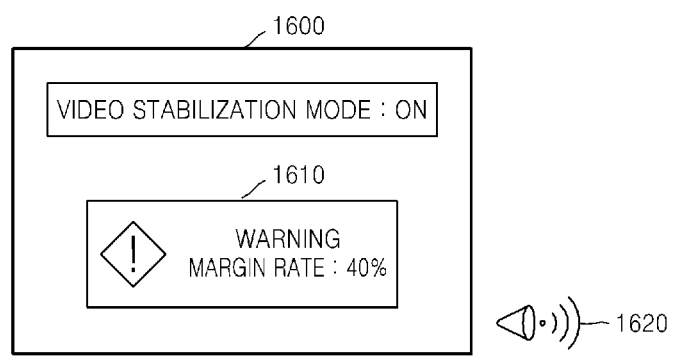
FIG. 16 is a diagram showing a user interface for providing a warning relating to an excessive video stabilization operation while performing a video stabilization operation, according to an exemplary embodiment of the present inventive concept.

FIG. 16 is a diagram showing a user interface for warning an excessive video stabilization operation while performing a video stabilization operation, according to an exemplary embodiment of the present inventive concept.

Any one of the video stabilization apparatuses 100, 200, 300, 400, 500, or 600 may be equipped in the same manner as the video stabilization device 710 of the video stabilization apparatus 700. The stabilization index measurer 720 of the video stabilization apparatus 700 may measure a degree of video stabilization in each stage while performing a video stabilization operation. The stabilization index measurer 720 may measure a stabilization related index by sensing the degree of video stabilization in real-time during the video stabilization operation.

The video stabilization apparatus 700 may measure a stabilization related index, such as a margin area size generated through a video stabilization operation, a magnitude of a video camera motion sensed through a sensor, or a magnitude of an inter-frame camera motion, in real-time. For example, since a camera view direction adjustment angle, which is camera motion information to be compensated for, varies proportionally as a difference between a camera motion path and an accumulated inter-frame camera view direction, which is generated by the video stabilization apparatus 700, varies, excessive video stabilization may be predicted. Accordingly, the camera view direction adjustment angle may be used as a stabilization-related index.

The stabilization index measurer 720 may sense a stabilization-related index in real-time in a video stabilization operation of the video stabilization device 710. For example, the stabilization-related index may be measured in each of an inter-frame camera motion measuring stage, a camera view direction adjustment angle determining stage, and a camera view direction compensating stage of a video stabilization operation. The video stabilization warning unit 730 may warn in real-time or guide a user about a current stabilization state if the stabilization-related index measured in each of the inter-frame camera motion measuring stage, the camera view direction adjustment angle determining stage, and the camera view direction compensating stage of the video stabilization operation exceeds a predetermined threshold. The real-time warning may be implemented by a warning window 1610 displayed on a user interface 1600 or an audio warning sound 1620.

For example, if a camera motion sensed by the stabilization index measurer 720 exceeds the threshold during an inter-frame camera motion measuring operation, the video stabilization warning unit 730 may warn in real-time. In addition, if a camera view direction adjustment angle sensed by the stabilization index measurer 720 exceeds the threshold during a camera view direction adjustment angle determining operation, the video stabilization warning unit 730 may warn in real-time. In addition, if a margin area sensed by the stabilization index measurer 720 exceeds the threshold during a camera view direction compensating operation, the video stabilization warning unit 730 may warn in real-time.

In addition, if the video stabilization warning unit 730 can predict a margin area based on camera motion information and camera view direction adjustment angle information in the inter-frame camera motion measuring stage and the camera view direction adjustment angle determining stage during the video stabilization operation, the video stabilization warning unit 730 may warn in real-time when the margin area exceeds the threshold during all of the video stabilization operation.

A user may predict a degree of a user's motion according to guidance or warning based on a video stabilization state of the video stabilization apparatus 700. That is, if there is guidance or warning that a video stabilization state is excessive, since it is analyzed that a user's camera motion requiring video stabilization is great, the user may prevent an excessive camera motion.

The threshold of the stabilization-related index may be determined within a computation amount which the video stabilization apparatus 700 can stably process by analyzing a current system and video. The threshold of the stabilization related index may be determined based on a trade-off of a margin area in comparison with a degree of video stabilization, which is set by the user.

Figure 17:
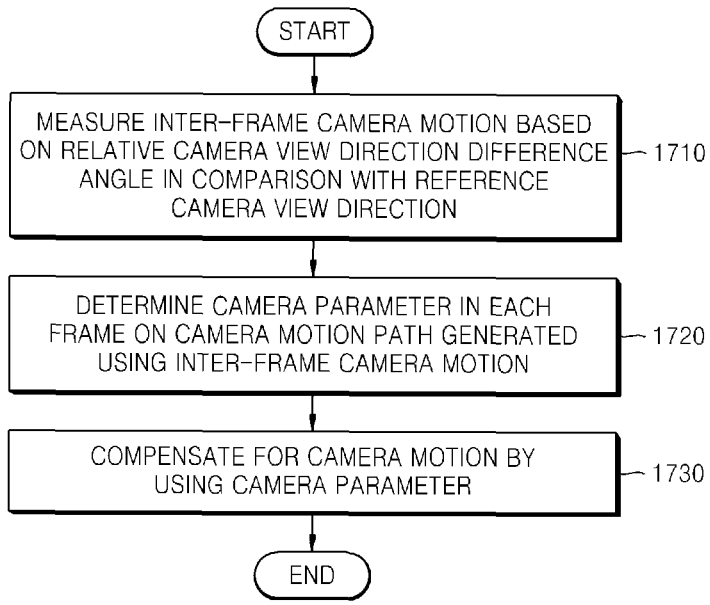
FIG. 17 is a flowchart of a video stabilization method according to an exemplary embodiment of the present inventive concept.

FIG. 17 is a flowchart of a video stabilization method according to an exemplary embodiment of the present inventive concept.

Referring to FIG. 17, in operation 1710, a difference angle of a current camera view direction in comparison with a reference camera view direction is determined in each frame of a frame sequence of a video, and an inter-frame camera motion is measured based on the relative difference angle of the current camera view direction in comparison with the reference camera view direction.

In operation 1720, a camera motion path of the frame sequence is generated by using the inter-frame camera motion, and a camera parameter in each frame is determined by using the camera motion path. The camera parameter may include camera displacement and/or camera direction compensation values on the camera motion path for camera motion compensation.

In operation 1730, a camera motion is compensated for by using the camera parameter in each frame.

The video stabilization method according to the exemplary embodiment of FIG. 17 corresponds to the video stabilization scheme of compensating for a camera motion by extracting only relative rotation angle information relating to inter-frame camera motion in the video stabilization apparatus 100 according to the exemplary embodiment of FIG. 1.

Figure 18:
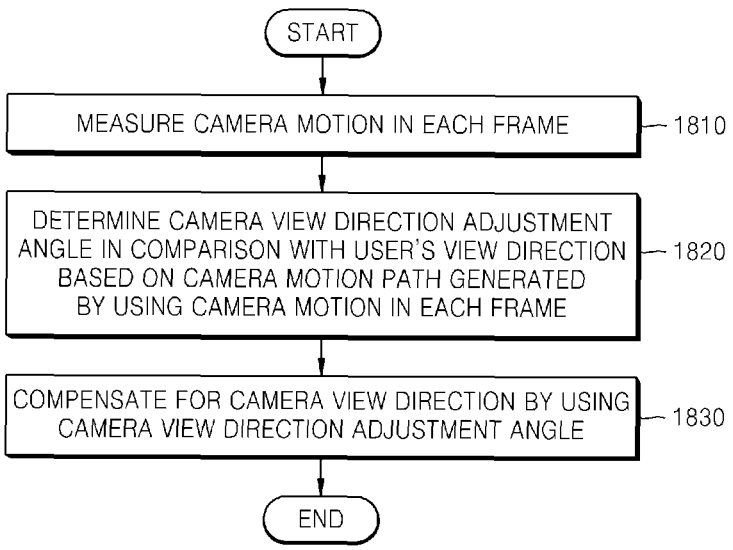
FIG. 18 is a flowchart of a video stabilization method according to another exemplary embodiment of the present inventive concept.

FIG. 18 is a flowchart of a video stabilization method according to another exemplary embodiment of the present inventive concept.

Referring to FIG. 18, in operation 1810, a camera motion is measured in each frame of a frame sequence of a video. In operation 1820, a camera motion path of the frame sequence is generated by using the camera motion in each frame, and a camera view direction adjustment angle between a user's view direction and a camera view direction is determined by using the camera motion path. In operation 1830, the camera view direction is compensated for by using the camera view direction adjustment angle in each frame.

The video stabilization method according to the exemplary embodiment of FIG. 18 corresponds to the video stabilization scheme of compensating for a camera motion by adjusting only a camera view direction to a user's view direction on a camera motion path in the video stabilization apparatus 200 according to the exemplary embodiment of FIG. 2.

Figure 19:
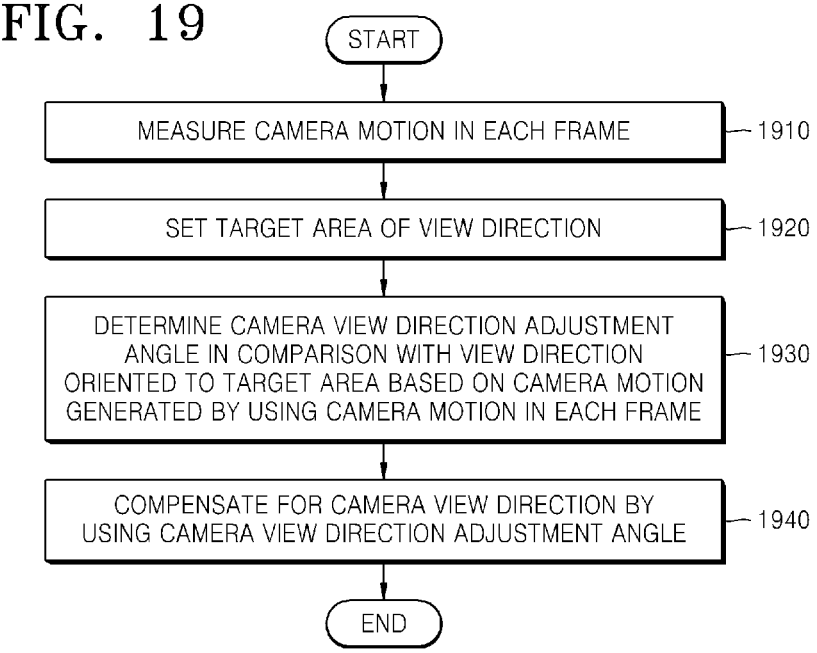
FIG. 19 is a flowchart of a video stabilization method according to another exemplary embodiment of the present inventive concept.

FIG. 19 is a flowchart of a video stabilization method according to another exemplary embodiment of the present inventive concept.

Referring to FIG. 19, in operation 1910, a camera motion is measured in each frame of a frame sequence of a video. In operation 1920, a target area of a view direction in the frame sequence is determined. In operation 1930, a camera motion path of the frame sequence is generated by using the camera motion in each frame, and a camera view direction adjustment angle based on a view direction oriented to the target area is determined by using the camera motion path. In operation 1940, a camera view direction is compensated for by using the camera view direction adjustment angle in each frame.

The video stabilization method according to the exemplary embodiment of FIG. 19 corresponds to the video stabilization scheme of compensating for a camera motion by adjusting only a camera view direction to a view direction oriented to a target area on a camera motion path in the video stabilization apparatus 300 according to the exemplary embodiment of FIG. 3.

Figure 20:
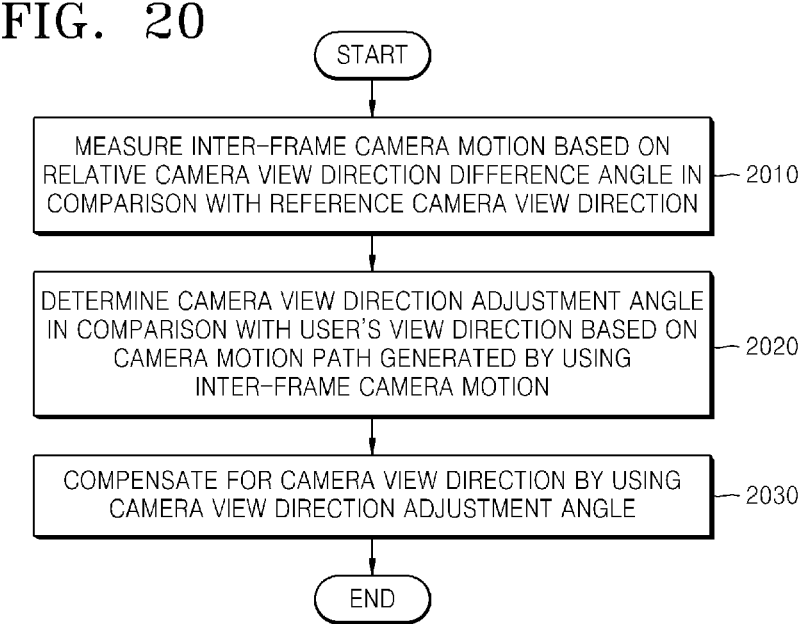
FIG. 20 is a flowchart of a video stabilization method according to another exemplary embodiment of the present inventive concept.

FIG. 20 is a flowchart of a video stabilization method according to another exemplary embodiment of the present inventive concept.

Referring to FIG. 20, in operation 2010, a difference angle of a current camera view direction in comparison with a reference camera view direction is determined in each frame of a frame sequence of a video, and an inter-frame camera motion is measured based on the relative difference angle of the current camera view direction in comparison with the reference camera view direction. In operation 2020, a camera motion path of the frame sequence is generated by using the inter-frame camera motion, and a camera view direction adjustment angle based on a user's view direction is determined by using the camera motion path. In particular, the user's view direction may be set to a camera view direction oriented to a target area according to a user's input.

In operation 2030, a camera view direction is compensated for by using the camera view direction adjustment angle in each frame.

The video stabilization method according to the exemplary embodiment of FIG. 20 corresponds to the video stabilization scheme of compensating for a camera motion by extracting only relative rotation angle information according to an inter-frame camera motion and adjusting only a camera view direction to a view direction oriented to a target area on a camera motion path in the video stabilization apparatus 400 according to the exemplary embodiment of FIG. 4.

Figure 21:
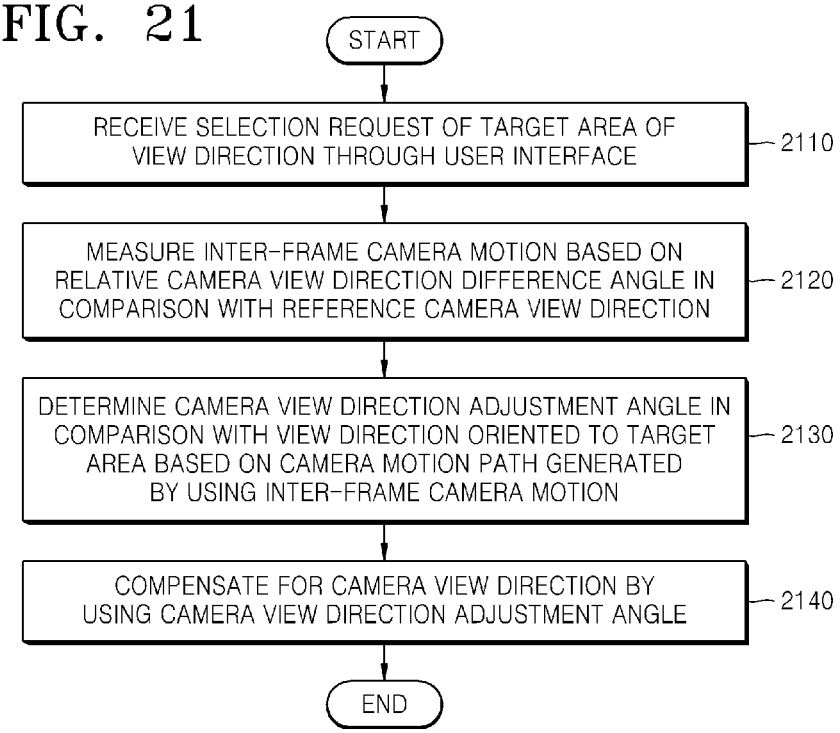
FIG. 21 is a flowchart of a video stabilization method according to another exemplary embodiment of the present inventive concept.

FIG. 21 is a flowchart of a video stabilization method according to another exemplary embodiment of the present inventive concept.

Referring to FIG. 21, in operation 2110, a selection request of a target area of a view direction in a frame sequence is received from a user through a user interface. In operation 2120, a difference angle of a current camera view direction in comparison with a reference camera view direction is determined in each frame of a frame sequence of a video, and an inter-frame camera motion is measured based on the relative difference angle of the current camera view direction in comparison with the reference camera view direction.

In operation 2130, a camera motion path of the frame sequence is generated by using the inter-frame camera motion, and a camera view direction adjustment angle based on a view direction oriented to a target area is determined by using the camera motion path. In operation 2140, a camera view direction is compensated for by using the camera view direction adjustment angle in each frame.

The video stabilization method according to the exemplary embodiment of FIG. 21 corresponds to the video stabilization scheme of compensating for a camera motion by considering a target area of a view direction according to a user's input in the video stabilization apparatus 500 according to the exemplary embodiment of FIG. 5. Accordingly, the video stabilization method according to the exemplary embodiment of FIG. 21 may conform to the video stabilization methods according to the exemplary embodiments of FIGS. 17 to 20.

Figure 22:
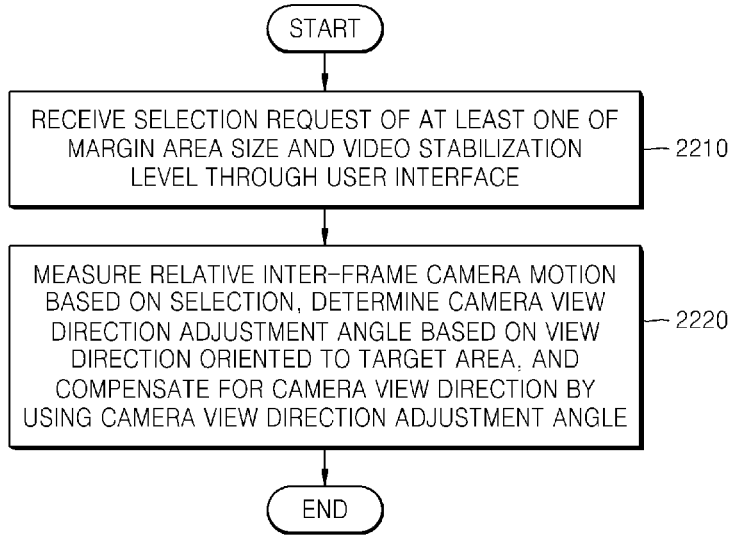
FIG. 22 is a flowchart of a video stabilization method according to another exemplary embodiment of the present inventive concept.

FIG. 22 is a flowchart of a video stabilization method according to another exemplary embodiment of the present inventive concept.

Referring to FIG. 22, in operation 2210, a selection request of at least one of a margin area size and a stabilization level for video stabilization is received from a user through a user interface.

In operation 2220, a video stabilization operation for stabilizing a video of a camera is performed by measuring a relative inter-frame camera motion based on a reference camera view direction in a frame sequence of a video based on the at least one of the margin area size and the stabilization level, determining a camera view direction adjustment angle based on a view direction oriented to a target area, and compensating for a camera view direction by using the camera view direction adjustment angle in each frame. The video stabilization operation in operation 2220 may conform to the video stabilization methods according to the exemplary embodiments of FIGS. 17 to 20.

The video stabilization method according to the exemplary embodiment of FIG. 22 corresponds to the video stabilization scheme of compensating for a camera motion by considering a margin area according to a user's input in the video stabilization apparatus 600 according to the exemplary embodiment of FIG. 6.

Figure 23:
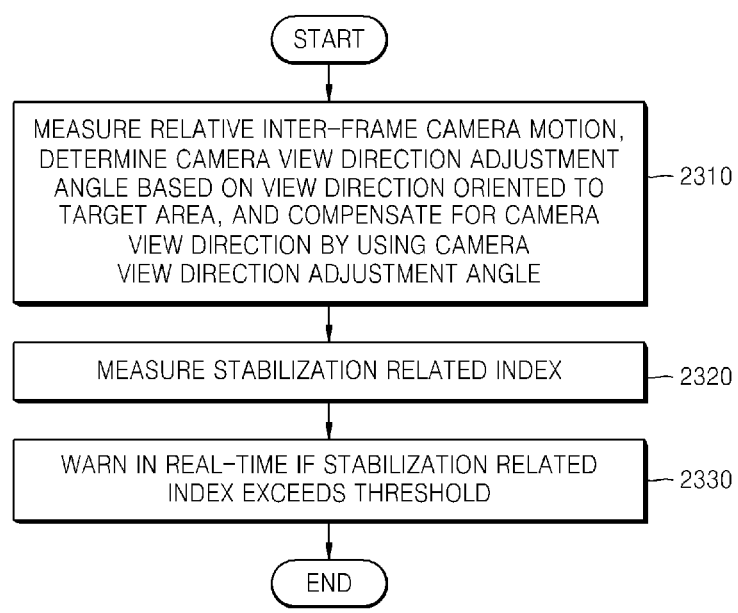
FIG. 23 is a flowchart of a video stabilization method according to another exemplary embodiment of the present inventive concept.

FIG. 23 is a flowchart of a video stabilization method according to another exemplary embodiment of the present inventive concept.

Referring to FIG. 23, in operation 2310, a video of a camera is stabilized by measuring a relative inter-frame camera motion based on a reference camera view direction in a frame sequence of the video, determining a camera view direction adjustment angle based on a view direction oriented to a target area, and compensating for a camera view direction by using the camera view direction adjustment angle in each frame.

In operation 2320, a stabilization-related index is measured while performing the stabilization of the video of the camera of operation 2310. In operation 2330, warning is performed in real-time if the stabilization-related index exceeds a predetermined threshold.

The video stabilization method according to the exemplary embodiment of FIG. 23 corresponds to the video stabilization scheme of the video stabilization apparatus 700 according to the exemplary embodiment of FIG. 7.

Since conventional video stabilization methods based on two dimensional (2D) analysis compensate for an original image by using a simple parallel movement scheme or a simple warping scheme, image distortion occurs. In addition, since conventional 3D analysis-based methods generate a new image by reconstructing a 3D image, a relatively correct image can be generated. However, since a considerable amount of computation is required to reconstruct the 3D image and perfect reconstruction is difficult, image distortion still occurs.

On the contrary, since each of the video stabilization apparatuses 100, 200, 300, and 400 according to various exemplary embodiments of the present inventive concept and each of the video stabilization methods of FIGS. 17 to 22 implements a 3D scheme by predicting a view vector direction difference between images based on a conventional 2D analysis scheme and adjusting a camera view direction in each frame on a camera motion path instead of simple parallel movement of a camera position, a video having very low distortion in a point of view of human sight may be outputted.

Exemplary embodiments of the present inventive concept can be written as computer programs and can be implemented in general-use digital computers that execute the programs using a computer-readable recording medium. Examples of the computer-readable recording medium may include storage media such as magnetic storage media (e.g., ROM, floppy disks, hard disks, etc.) and optical recording media (e.g., CD-ROMs, or DVDs).

While the present inventive concept has been particularly shown and described with reference to exemplary embodiments thereof, it will be understood by those of ordinary skill in the art that various changes in form and details may be made therein without departing from the spirit and scope of the present inventive concept as defined by the appended claims. The exemplary embodiments should be considered in a descriptive sense only and not for purposes of limitation. Therefore, the scope of the present inventive concept is defined not by the detailed description of the exemplary embodiments but by the appended claims, and all differences within the scope will be construed as being included in the present disclosure.

What is claimed is:

1. A video stabilization method comprising:
    measuring an inter-frame camera motion based on an angle of a relative camera view direction with respect to a reference camera view direction in each frame of a frame sequence of a video;
    generating a camera motion path of the frame sequence by using the measured inter-frame camera motion and determining a camera parameter for each frame by using the generated camera motion path; and
    compensating for a camera motion by using the determined camera parameter for each frame.

2. The video stabilization method of claim 1, wherein the measuring of the inter-frame camera motion comprises determining a difference angle of relative camera view directions between each pair of temporally successive frames in the frame sequence.

3. The video stabilization method of claim 2, wherein the measuring of the inter-frame camera motion further comprises computing an average of the difference angles of the relative camera view directions between each pair of temporally successive frames in the frame sequence and using the computed average as the reference camera view direction.

4. The video stabilization method of claim 1, wherein the measuring of the inter-frame camera motion comprises measuring relative camera rotation angles in each of an X-axis direction, a Y-axis direction, and a Z-axis direction.

5. The video stabilization method of claim 4, wherein the measuring of the inter-frame camera motion further comprises determining a camera rotation angle in the Z-axis direction by using straight-lined motions occurring in respective predetermined areas on a Z-axis plane.

6. The video stabilization method of claim 5, wherein the determining of the camera rotation angle in the Z-axis direction comprises:
    determining magnitudes and directions of straight-lined motion vectors occurring in the respective predetermined areas on the Z-axis plane in correspondence with each of respective rotation angles within a predetermined range;
    determining a cost value based on an error between an image moved by a straight-lined motion vector and a corresponding area of a frame in a reference camera reference view direction for each of the respective predetermined areas and summing the cost values of the respective predetermined areas; and
    detecting a rotation angle generating a minimum total cost value by determining the summed cost value of the respective predetermined areas for each of the respective rotation angles and comparing the summed cost values to each other, and using the detected rotation angle as the camera rotation angle in the Z-axis direction.

7. The video stabilization method of claim 6, wherein the magnitudes and directions of the straight-lined motion vectors occurring in the respective predetermined areas in correspondence with each of the respective rotation angles are determined based on respective distances and respective directions from an original point of the Z-axis plane to each of the corresponding predetermined areas, respectively.

8. The video stabilization method of claim 1, wherein the determining of the camera parameter comprises:
    generating the camera motion path of the frame sequence by accumulating information relating to the inter-frame camera motion;

generating a global camera motion path of the generated camera motion path; and determining a camera adjustment value for each frame with respect to the global camera motion path.

9. The video stabilization method of claim 1, wherein the compensating for the camera motion comprises:

rotating the camera view direction by a view direction adjustment value relating to the determined camera parameter; and moving a camera position by a displacement adjustment value relating to the determined camera parameter.

10. The video stabilization method of claim 1, wherein the measuring of the inter-frame camera motion comprises measuring an inter-viewpoint camera motion based on a difference angle of a remaining viewpoint camera view direction with respect to a reference viewpoint camera view direction determined by using a left-viewpoint frame and a right-viewpoint frame corresponding to each other in each frame of a stereoscopic video.

11. A video stabilization apparatus comprising:

a camera motion measurer which measures an inter-frame camera motion based on a difference angle of a relative camera view direction with respect to a reference camera view direction in each frame of a frame sequence of a video;

a camera parameter determiner which generates a camera motion path of the frame sequence by using the measured inter-frame camera motion and determines a camera parameter for each frame by using the generated camera motion path; and a camera motion compensator which compensates for a camera motion by using the determined camera parameter for each frame.

12. A non-transitory computer-readable recording medium storing a computer-executable program for performing the video stabilization method of claim 1.

* * * * *